United States Patent [19]
Graves

[11] Patent Number: 6,077,484
[45] Date of Patent: Jun. 20, 2000

[54] TABLET FEEDER FOR WATER AND/OR WASTEWATER

[75] Inventor: Jan D. Graves, Norwalk, Ohio

[73] Assignee: Norwalk Wastewater Equipment Company, Norwalk, Ohio

[21] Appl. No.: 09/064,131

[22] Filed: Apr. 22, 1998

[51] Int. Cl.[7] ...................................................... B01D 11/02
[52] U.S. Cl. .......................... 422/277; 422/255; 422/261; 422/276
[58] Field of Search .................................... 422/255, 261, 422/264, 274, 276, 277, 278

[56] References Cited

U.S. PATENT DOCUMENTS

| | | |
|---|---|---|
| 2,649,203 | 8/1953 | Hannibal . |
| 3,195,985 | 7/1965 | Elkin . |
| 3,495,948 | 2/1970 | Long et al. . |
| 3,595,786 | 7/1971 | Horvath et al. . |
| 3,746,170 | 7/1973 | Bloom et al. . |
| 4,117,560 | 10/1978 | Kidon et al. . |
| 4,211,655 | 7/1980 | Jordan . |
| 4,338,191 | 7/1982 | Jordan . |
| 4,584,106 | 4/1986 | Held . |
| 4,732,689 | 3/1988 | Harvey et al. . |
| 4,759,907 | 7/1988 | Kawolics et al. . |
| 5,089,127 | 2/1992 | Junker et al. . |
| 5,350,512 | 9/1994 | Tang . |
| 5,405,540 | 4/1995 | Tang . |
| 5,441,073 | 8/1995 | Hoadley . |
| 5,441,711 | 8/1995 | Drewery . |

*Primary Examiner*—Robert J. Warden, Sr.
*Assistant Examiner*—Fariborz Moazzam
*Attorney, Agent, or Firm*—Diller, Ramik & Wight, PC

[57] ABSTRACT

A low/intermediate/high flow tablet feeder is provided for the controlled dissolution of a solid treating agent in flowing liquid, such as water or wastewater. The tablet feeder includes a bottom wall which is contoured to define first, second and third fluid flow paths which are operative at low, intermediate and high volume/height fluid flow. An adjustable sluice is provided adjacent a downstream outlet of a chamber defined by the tablet feeder, and a sectional riser can be associated with the tablet feeder for extended or below grade installations.

79 Claims, 13 Drawing Sheets

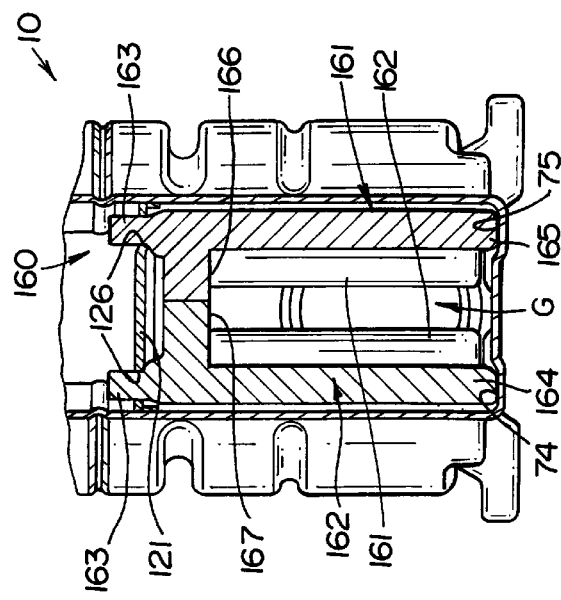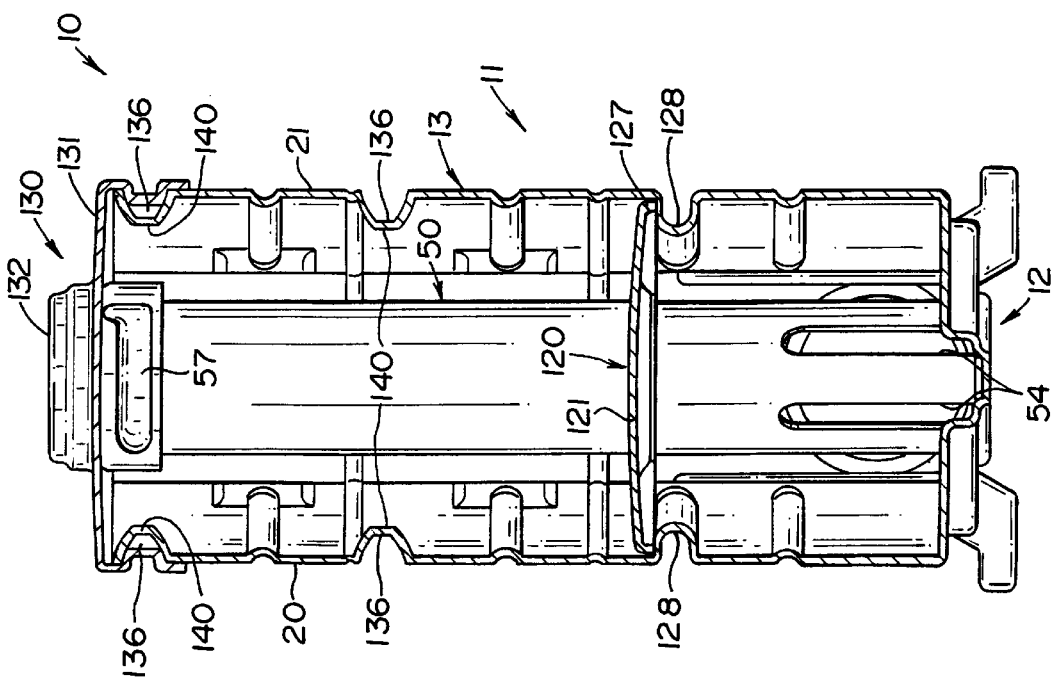

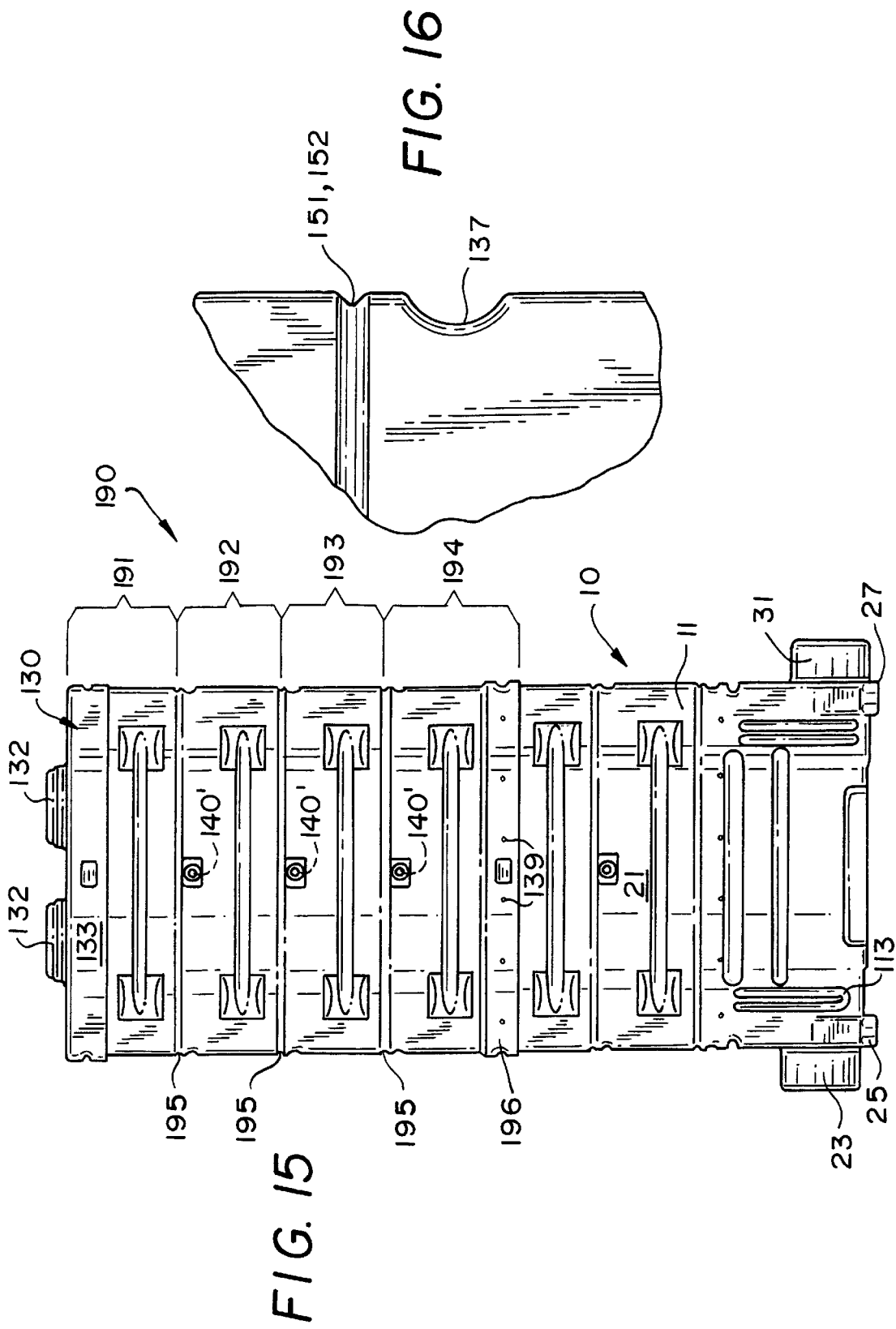

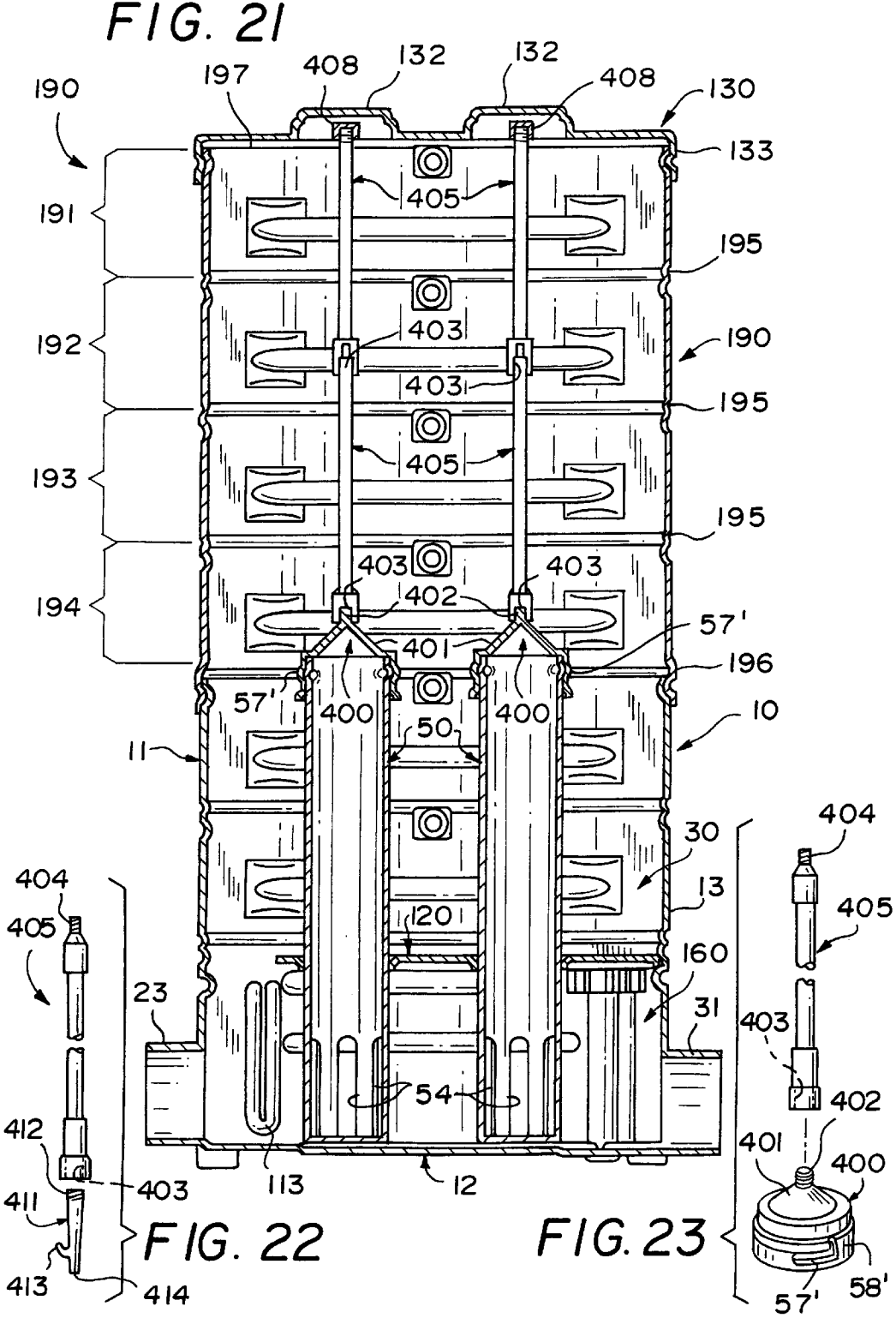

TABLET FEEDER FOR WATER AND/OR WASTEWATER

BACKGROUND OF THE INVENTION

In U.S. Pat. No. 3,595,786 granted on Jul. 27, 1971 to Horvath et al. for an apparatus for treating fluids, a feeder device is disclosed which includes a dissolution chamber having a liquid/wastewater/water inlet and an outlet. The wastewater passing through the dissolution chamber contacts chemical treating agents in the form of tablets stacked within cylinders having lateral openings exposing lowermost of the tablets to the wastewater. An adjustable weir is arranged down-stream of the tablet cylinders which creates a degree of damming of the wastewater within the dissolution chamber. The adjustable weir is designed to provide an adjustable height of the liquid level within the dissolution chamber at different flow rates of the wastewater to better concentrate and disperse the treating agent therethrough. At different flow rates the height of the liquid level in the dissolution chamber is obviously different, and it is highly desirable to create a proportional relationship between the flow rate of the wastewater and the amount of chemical treating agent which is dissolved therein.

In U.S. Pat. No. 4,759,907 granted on Jul. 26, 1988 to Kawolics et al., a feeder device for controlled dissolution of a solid treating agent in a liquid of variable flow rate is designed such that the concentration of treating agent in the effluent liquid or wastewater can be substantially constant, irrespective of the actual flow rate of the liquid. The consistency of the concentration of the agent is obtained by the provision of an upstream proportional weir positioned in connection with a dissolution chamber which maintains a liquid volume in the dissolution chamber which can be linearly proportional to the flow rate of the liquid therethrough. The weir can be fixed or can be adjustable for varying chemical concentration dependent upon liquid flow.

In U.S. Pat. No. 3,495,948 granted to Long et al. on Feb. 17, 1970, a bypass dissolver includes two main chambers, one receiving a larger, untreated flow portion and the other chamber receiving a minor flow portion wherein the chemical treating agent is dissolved during its passage in contact with a pervious magazine of treating agent. The bypass dissolver is designed such that the flow rate of the smaller stream portion, in which the treating agent is dissolved, remains constant irrespective of the flow rate of the larger stream portion or the total flow rate. Thus, the dissolution rate of the treating agent is constant over time, independent of the total flow rate.

In U.S. Pat. No. 3,746,170 granted to Bloom et al. on Jul. 17, 1973, a liquid-treating apparatus includes a tank wherein the liquid to be treated is kept at a constant level and containers with treating agent are immersed into the liquid at an adjustable immersion depth. Manual adjustment of these containers to control the immersion depth is required. A constant concentration of treating agent in the liquid passing through this apparatus may not be obtained therewith.

Other patents in the field of wastewater treatment include Jordan, U.S. Pat. No. 4,211,655 issued on Jul. 8, 1980; Held, U.S. Pat. No. 4,584,106 issued on Apr. 22, 1986; Junker et al., U.S. Pat. No. 5,089,127 issued on Feb. 18, 1992; Kidon et al., U.S. Pat. No. 4,117,560 issued on Oct. 3, 1978; Hoadley, U.S. Pat. No. 5,441,073 issued on Aug. 15, 1995; Drewery, U.S. Pat. No. 5,441,711 issued on Aug. 15, 1995; Elkin, U.S. Pat. No. 3,195,985 issued on Jul. 20, 1965; Harvey, U.S. Pat. No. 4,732,689 issued on Mar. 22, 1998; Hannibal, U.S. Pat. No. 2,649,203 issued on Aug. 18, 1953; and Tang, U.S. Pat. No. 5,405,540 issued on Apr. 11, 1995.

U.S. Pat. No. 4,338,191 issued on Jul. 6, 1982 to Jordan and U.S. Pat. No. 5,350,512 issued to Tang on Sep. 27, 1994 are particularly directed to chlorination and dechlorination systems for wastewater or other fluid in which a container formed of space chamber portions connected by cylindrical-like tubular sections in vertical alignment house therein cylindrical tubes for holding a supply of stacked chemical treating tablets which are fed in magazine fashion vertically downwardly so that as the tablets are dissolved at the bottom of the container due to the contact thereof with the liquid, the tablets automatically feed down by gravity. U.S. Pat. No. 4,338,191 specifically discloses cylindrical-like tubular sections between the vertically spaced chamber portions of the container for accurately guiding and locating the tablet dispensing holder members or tubes in their operative positions. This patent also discloses four such tablet feeders associated with a chamber and weirs for regulating the flow of wastewater therethrough.

SUMMARY OF THE INVENTION

In keeping with the foregoing, the present invention is directed to a flow rated proportional tablet feeder that provides for long-term unattended operation while providing a stable, digestible chemical dose by the emersion of feed tubes containing vertically stacked chemical tablets, such as chlorination and dechlorination tablets. The chemical agents are released as the wastewater liquid erodes the tablets.

The major components of the tablet feeder of the present invention include an integral one-piece molded inlet hub, an inlet baffle; a tiered flow deck including an inert drainage tier, an intermediate flow tier and an upper flow tier; a stationary feed tube insert, feed tubes (two or four), an outlet weir with an optional sluice, a hydrodynamic mixing chamber, and an integral one-piece molded outlet hub.

The tablet feeder is constructed of high density UV rated, rotationally molded polyethylene for maximum strength and durability. The tablet feeder is a complete dry chemical dosing system that allows dosage capability ranging from 1 to 50 mg/L, according to the operational flow rating (GPD) of the system. A peak flow factor of four is used for non-flow equalized wastewater applications to insure proper dosage. The tablet feeder is elliptical in shape to utilize the velocity and energy of the liquid/wastewater for consistent chemical application. The feeder is supplied as a self-enclosed unit suitable for direct burial without the need for a secondary manhole or enclosure.

All flow entering the tablet feeder passes through the inlet hub and is channeled under an inlet baffle. The inlet baffle is located so that a bottom of the baffle is positioned below the mean liquid level of the wastewater. The baffle is configured to minimize the effect of periodic flow surges and optimize the dissolution pattern of the chemical tablets. The baffle is preferably vertically adjustable and is selectively held in place by the friction grip of molded slots in the feeder side wall. The baffle can maintain chemical dosages during low flow periods, while regulating chemical dosage during high flow periods.

The feeder includes a multi-tiered flow deck molded into a bottom wall of the overall tablet feeder housing which is configured to control liquid velocity within and through the feeder. The configuration results in a stable chemical dose throughout the operating range of the feeder and eliminates the potential for tablet degradation. The flow deck includes three separate vertically offset fluid flow tiers designed to optimize the intrinsic energy of the liquid. The lowest tier is somewhat bar-bell shaped and functions as the inert drainage tier and encompasses all chemical feed tubes. This lowest tier traverses the entire length of the feeder along the bottom wall from the feeder inlet to the feeder outlet. The lowermost tier is employed during extremely low or no flow conditions to form a drainage channel for inert particles and eliminates tablet swelling. When flow rates increase up to three gallons per minute, the liquid level rises to an intermediate fluid flow tier. The intermediate tier is substantially hyperbolic in shape and traverses the length of feeder from the inlet to the outlet. The intermediate tier or channel increases flow velocity to insure accurate and consistent chemical delivery at higher flow rates and also reduces or eliminates tablet wicking. At flow rates greater than three gallons per minute, the liquid level rises to an upper fluid flow tier or channel of the tablet feeder. The upper tier or channel provides uniform flow velocity, automatic adjustable tablet dissolution and constant chemical dosage throughout the anticipated highest flow operating range of the tablet feeder.

The housing of the tablet feeder includes horizontal ribs which form a shelf for supporting a stationary horizontal insert which traverses an area above the flow deck. Cylindrical tablet feed tubes pass through tapered locating holes in the stationary insert for ease of feed tube installation and removal. For direct burial applications, drill points are provided on the exterior of the feeder body or feeder housing and the stationary insert can be permanently affixed to the feeder body with synthetic drive rivets.

The tablet feeder is preferably provided with one-piece polyethylene feed tubes with each feed tube having an upper end portion equipped with a twist lock cap for safety. The bottom of each feed tube includes two integrally molded drainage ribs which allow the flow stream to purge inert particles and accomplish dry down of chemical tablets during no flow periods. Preferably, the liquid flows through six equally spaced openings in each feed tube lower end portion for contact with the chemical tablets located therein.

The tablet feeder also includes an adjustable outlet sluice to allow regulation of the liquid static head within the feeder and provide precise control over chemical dosage. The adjustable outlet sluice provides a one inch to three inch adjustable outlet width. Sluice operations effect precise adjustment of the chemical dosage throughout the operating range of the tablet feeder. Adjustment is effected by rotating a molded plastic hex nut located at the top of each of left and right sections of the outlet sluice. The hex nut protrudes through the stationary horizontal insert to allow for adjustment from grade with a standard socket. The right and left sections of the adjustable outlet sluice are synchronized in operation by integrally molded meshed gears or gear segments. Each gear segment includes stop limits to insure that the sluice will operate within the desired design range (1" to 3"). Each adjustable sluice section includes a top-mounted opening indicator which provides the operator with a visual indication of the sluice position, and an engraved scale on the stationary horizontal insert indicates the sluice opening in inches. In order to provide operational flexibility, the adjustable outlet sluice is always used when an access riser is installed.

The tablet feeder of the invention also includes a hydrodynamic mixing chamber downstream of the outlet sluice to induce turbulent flow prior to discharge. The hydrodynamic mixing chamber utilizes the induced turbulence of the outlet sluice to provide thorough mixing of the chemical. The hydrodynamic mixing chamber is designed to hydrodynamically eliminate the laminar flow induced upstream by the multi-tiered flow deck and prevents flow from short-circuiting the treatment process.

In order to provide maximum installation flexibility and eliminate the need for confined space entry equipment, option risers are utilized in conjunction with the main feeder housing. Adjustable access risers allow direct burial of the tablet feeder and accommodate direct connection to existing system piping. Each riser is molded polyethylene with a nominal height of 24" and is adjustable in 6" vertical increments via trim lines molded into each riser between adjacent riser sections. The risers utilize the same molded cover as the tablet feeder body or housing, and each riser includes at least one transverse reinforcing struts to allow for direct burial. The reinforcing struts are held in position by opposite integrally molded retaining bosses. Molded drill points are provided to locate drive rivets in the riser.

For removal and reinstallation of feed tubes utilizing such risers, remote feed tube removal tools are associated with twist lock caps of the feed tubes. These corrosion resistant extension tools are formed of 6" sections which can be threaded to each other in whatever lengths are necessary to accommodate riser height. Each tool is threaded to an associated feed tube cap which is in turn connected to a tablet feed tube. Once thus assembled, the tool, which is in effect an extension handle, can be gripped adjacent the cover, once removed, of the uppermost riser to remove, recharge and reinstall the feed tube. Once installed, the feed tube extension handles and caps remain in place threaded to an associated feed tube cap.

BRIEF DESCRIPTION OF THE DRAWINGS

FIG. 10 is a vertical cross-sectional view through the tablet feeder housing immediately adjacent the inlet looking toward the outlet, and illustrates a bottom wall of the housing, a plurality of vertically offset flow tiers or channels of a multi-tiered flow deck, and the manner in which the peripheral flange of the horizontal stationary insert rests upon opposite inwardly directed horizontally aligned ribs of the housing.

FIG. 11 is a fragmentary cross-sectional view taken through the adjustable sluice members adjacent the outlet, and illustrates the manner in which lower and upper ends of each sluice members are journalled in lower journals of the bottom wall and in openings of the horizontal stationary insert, respectively.

FIG. 15 is a side elevational view of the tablet feeder of FIG. 1, but illustrates the cover first having been removed, an integral molded riser secured to an upper peripheral edge of the tablet feeder, and the cover secured to an uppermost riser section.

FIG. 16 is an enlarged fragmentary side elevational view of a juncture portion between adjacent riser sections of FIG. 15, and illustrates a narrow severance channel at adjacent riser sections along which 6" increments of the riser can be cut and removed to vary the overall height of the tablet feeder.

FIG. 21 is a vertical cross-sectional view taken through the tablet feeder of FIG. 15, and illustrates the manner in which sectional extension tools are connected to threaded ends of tablet feeder tube caps which are in turn threaded to upper ends of the tablet feeder tubes to withdraw, resupply and reinsert the tablet feeder tubes relative to the tablet feeder.

FIG. 22 is an exploded view of one section of the tools of FIG. 21, and illustrates a hook-like member that can be threaded thereto for adapting the tool for baffle plate withdrawal, insertion and/or reinsertion/replacement or adjustment.

FIG. 23 is an exploded view of another section of one of the tools of FIG. 21, and illustrates the manner in which the tool is threaded to a threaded portion of the tablet feeder tube cap.

DESCRIPTION OF THE PREFERRED EMBODIMENTS

Figure 1:
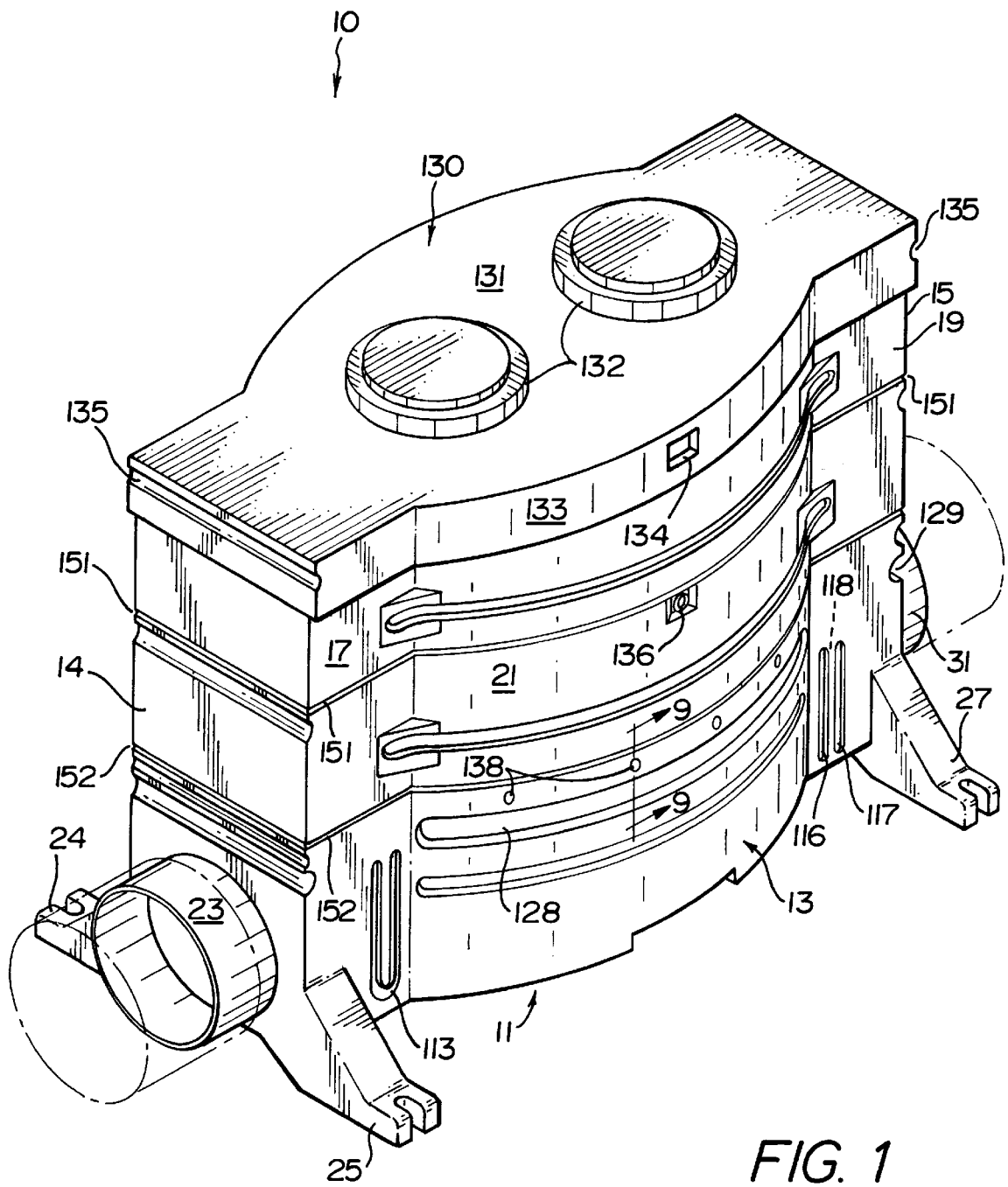
FIG. 1 is a perspective view of a novel tablet feeder of the present invention, and illustrates a container or housing of a generally elliptical configuration having a peripheral wall provided with a number of vertically spaced ribs, an uppermost cover, an inlet hub, an outlet hub, and opposite support feet.
Figure 2:
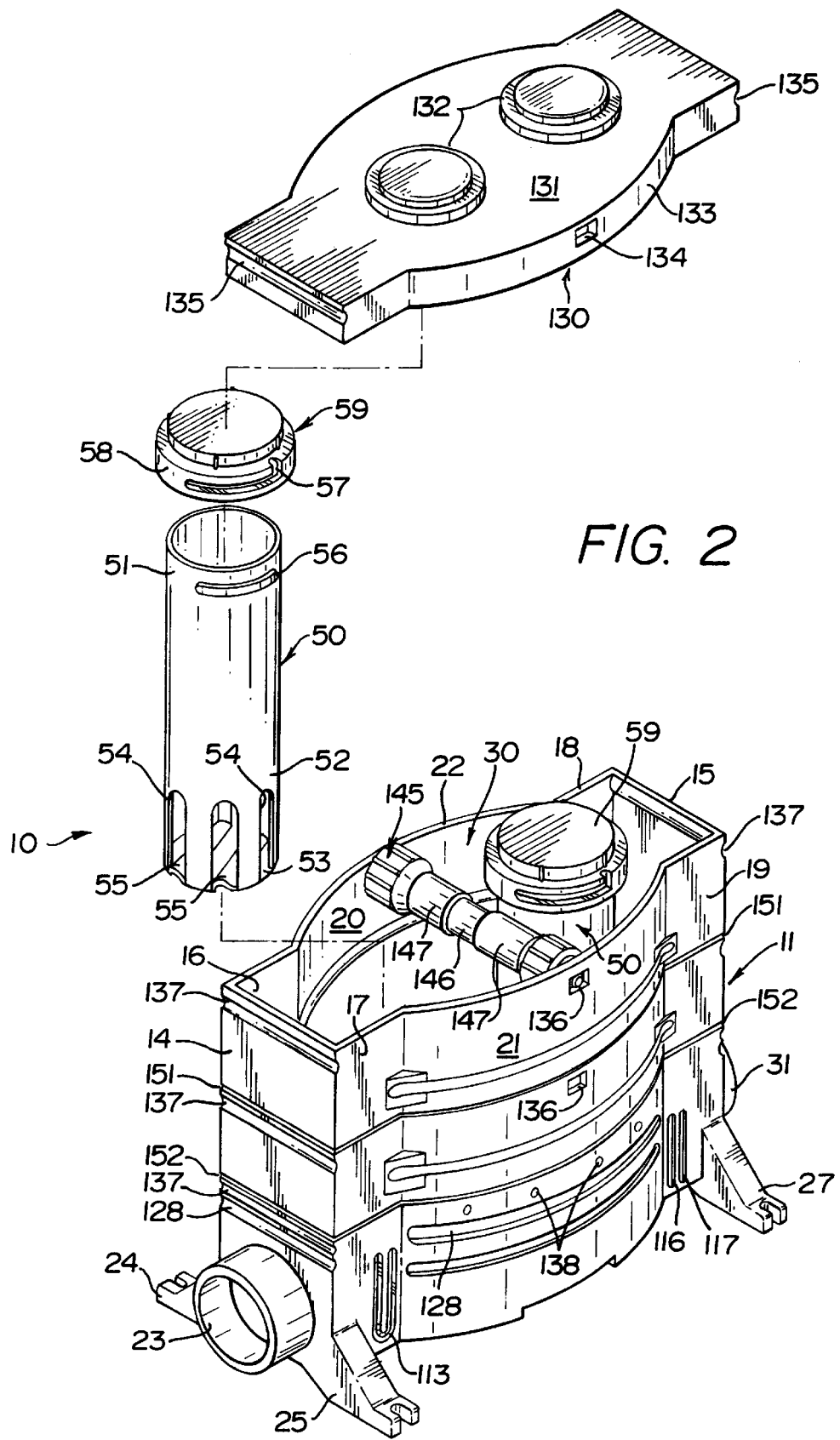
FIG. 2 is a perspective view of the tablet feeder with the cover removed, and illustrates two tablet feed tubes, a cap associated with each tablet feed tube, and a reinforcing strut traversing a fluid chamber of the tablet feeder housing.
Figure 3:
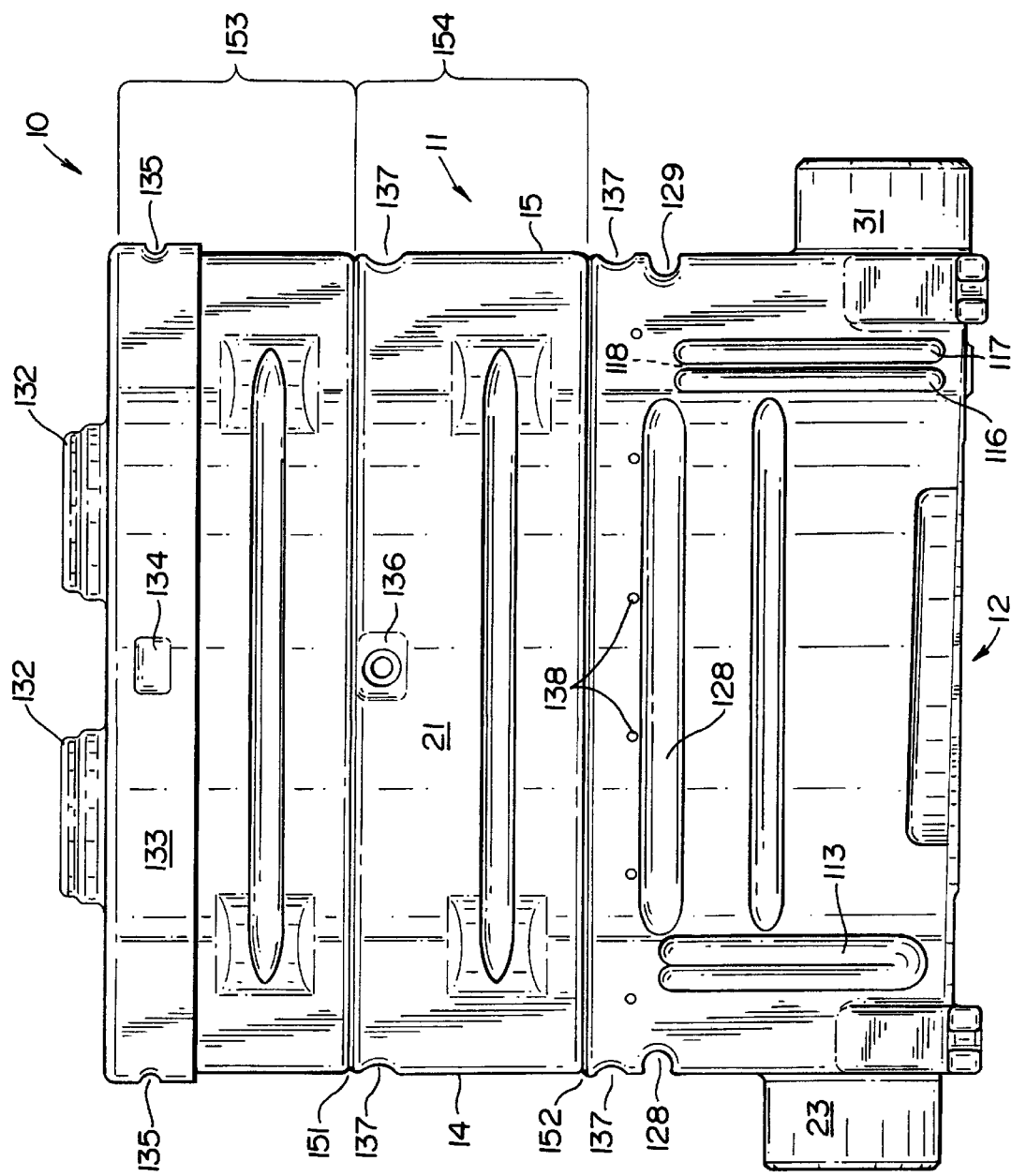
FIG. 3 is a side elevational view of the tablet feeder, and illustrates drill points for securing a horizontal stationary insert within the feeder housing, molded vertical ribs at the inlet and outlet which internally define slots for weir plates, and an integrally molded retaining boss associated with the transverse reinforcing strut.

A novel tablet feeder for the controlled dissolution of a solid treating agent in a flowing liquid, such as water or wastewater, is illustrated in FIGS. 1 through 13 of the drawings, and is generally designated by the reference numeral 10.

The tablet feeder 10 is designed for residential use, and includes a tablet housing or body 11 constructed of high density, UV rated, rotational molded polyethylene which provides for maximum strength and durability.

Figure 4:
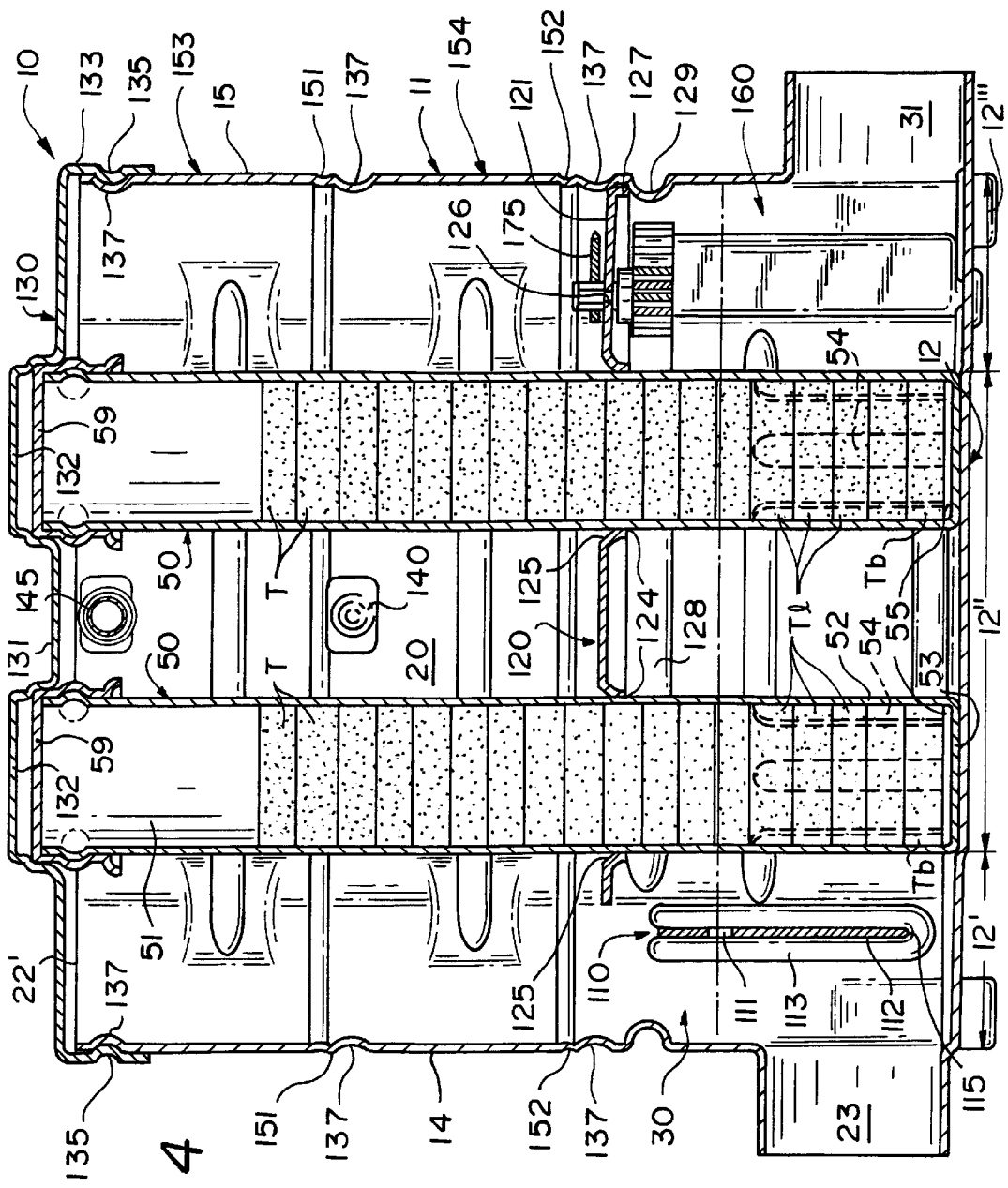
FIG. 4 is an enlarged vertical cross-sectional view taken generally along line 4—4 of FIG. 5, and illustrates a weir plate positioned adjacent the inlet hub, two tablet feed tubes and the tablets and caps associated therewith, the horizontal stationary insert, and an adjustable sluice adjacent the outlet hub of the feeder.
Figure 5:
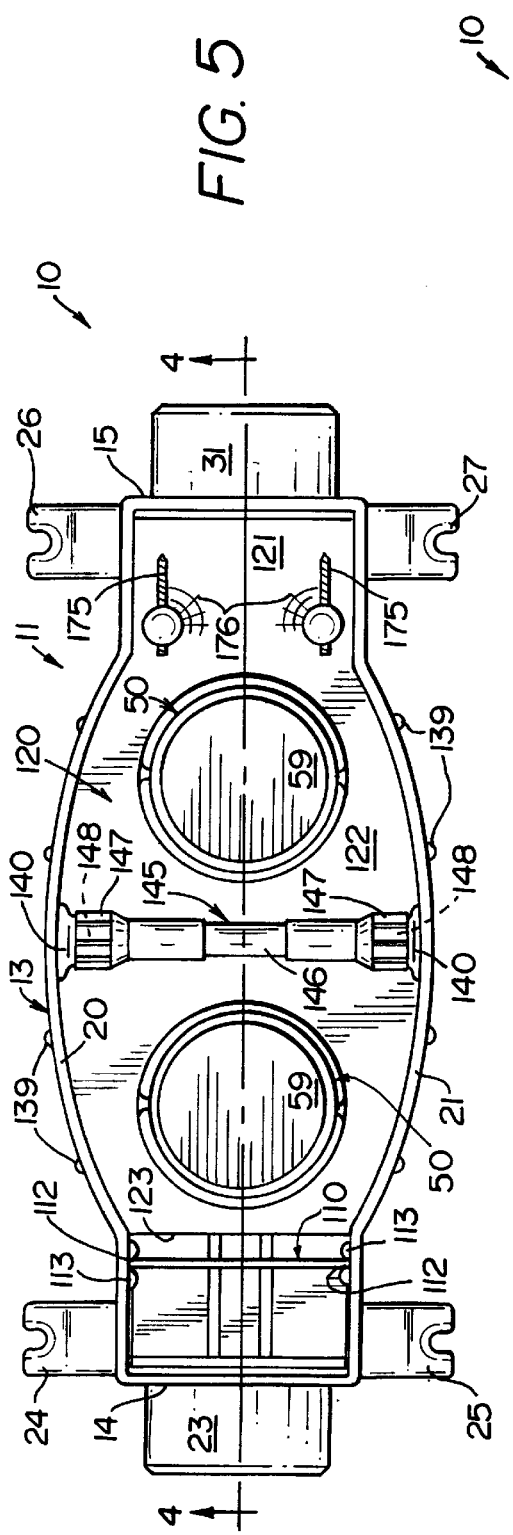
FIG. 5 is a top plan view of the tablet feeder looking downwardly in FIG. 4 with the cover removed, and illustrates the transverse reinforcing strut, the caps of the feed tubes, the weir plate adjacent the inlet hub, and indicators identifying the substantially maximum open position of the sluice.
Figure 7:
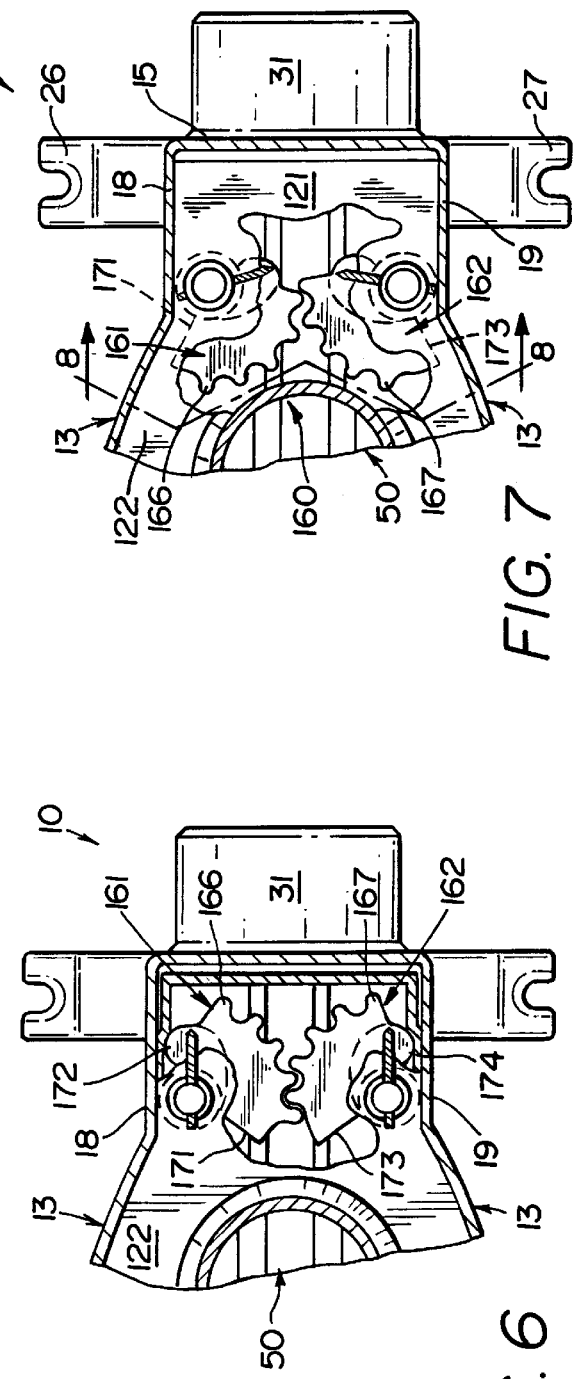
FIG. 7 is a fragmentary horizontal cross-sectional view similar to FIG. 6, and illustrates the sluice mechanism adjusted to another position.
Figure 12:
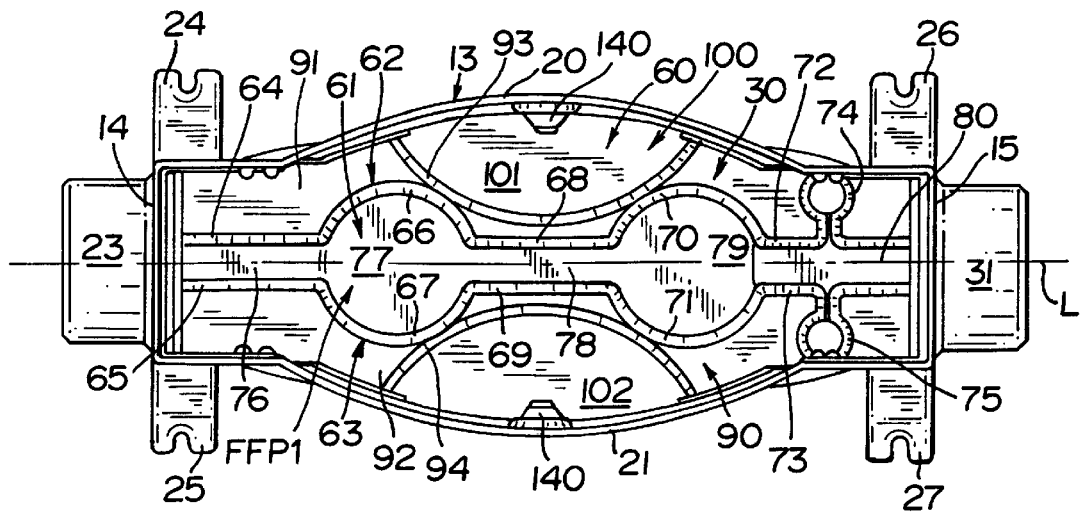
FIG. 12 is a horizontal cross-sectional view taken just above the bottom wall of the tablet feeder housing, and illustrates the multi-tiered flow deck defined thereby including uppermost, intermediate and lowermost flow tiers.

The tablet housing 11 includes a bottom wall 12 (FIGS. 3, 4 and 10) and a peripheral wall 13 of a generally elliptical shape, as viewed from above (FIGS. 5 and 12). The peripheral wall 13 is defined by an upstream end wall portion 14 which is substantially parallel to a downstream end wall portion 15. The upstream end wall portion 14 is substantially normal to upstream, generally parallel side wall portions 16, 17 which are in turn longitudinally aligned with respective downstream substantially parallel side wall portions 18, 19, respectively. Concavely inwardly opening and opposing medial wall portions 20, 21 blend with the respective side wall portions 16, 18 and 17, 19. The peripheral wall 13 terminates in an uppermost peripheral edge or edge portion 22. A generally cylindrical inlet hub 23 centered between an upstream pair of support feet 24, 25 defines an inlet for wastewater into an internal fluid chamber, flow chamber and/or dosage chamber 30 through which wastewater flows along the bottom wall 12 (FIG. 4) and exits or discharges through an outlet hub or outlet coupling 31 centered between a downstream pair of support feet 26, 27. During the flow of the wastewater through the chamber 30, the wastewater is treated with chemical agents which are released as the wastewater liquid erodes conventional chemical agent tablets, such as chlorination and dechlorination tablets T (FIG. 4), housed in identical tablet feeder tubes 50 (FIGS. 2 and 4) with lowermost of the tablets being generally designated by the reference character T1 and each bottom tablet by the reference character Tb.

Each tablet feed tube 50 is constructed from molded synthetic polymeric/copolymeric plastic material, such as polyethylene, and includes an upper end portion 51 and a lower end portion 52 closed by a bottom wall 53. The lower end portion 52 includes six opening means or slots 54 equally spaced circumferentially from each other and being generally disposed in parallel vertical upright relationship to each other. The bottom wall 53 also includes means 55 in the form of a pair of upwardly projecting downwardly opening parallel ribs or projections upon which seat the bottom tablet Tb (FIG. 4) of the tablets T. As will be described more fully hereinafter, this upward lifting or spacing of the lowermost tablet Tb and the remaining tablets T during no-flow conditions prevents tablet erosion. Preferably, the upper end portion 51 of each tablet feed tube 50 includes diametrically opposite locking ribs or locking projections 56 beneath which lock inwardly directed diametrically opposite locking ribs 57 carried by a peripheral flange 58 of each tablet feed tube cap 59.

Figure 13:
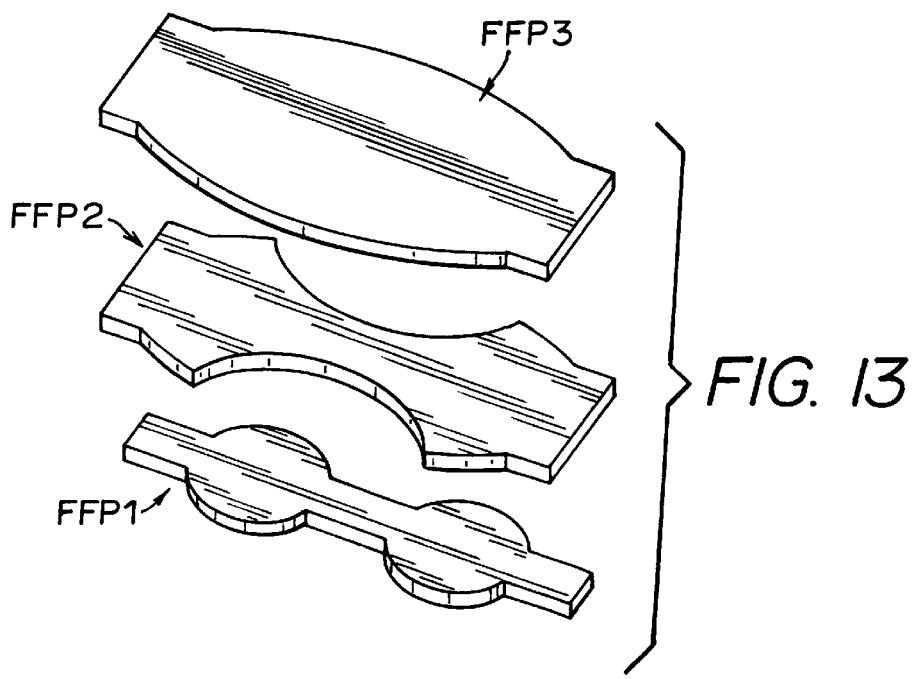
FIG. 13 is an exploded schematic view, and illustrates the configuration of lowermost, intermediate and uppermost flow patterns of the multi-tiered flow deck which accommodate respective low flow/no flow, intermediate flow and maximum flow conditions through the tablet feeder.

Reference is specifically made to FIGS. 4, 12 and 13 of the drawings which illustrate the manner in which the bottom wall 12 is stepped, partially tapered and configured to define a multi-tiered flow deck which is generally designated by the reference numeral 60. The multi-tiered flow deck 60 includes first means 61 in the form of a low flow fluid channel for defining a first fluid flow path FFP1 (FIG. 13) along the bottom wall 12 for increasing the exposure of the lowermost tablets Tl and particularly the bottom tablets Tb to relatively low velocity fluid flow along the bottom wall 12 from the inlet hub 23 to and through the outlet hub 31. The first means 61 is defined by opposite vertical channel walls 62, 63 which are in substantially opposing relationship to each other along opposite sides of a longitudinal center line L (FIG. 12) through the fluid chamber 30. The vertical channel walls 62, 63 include a pair of parallel upstream channel wall portions 64, 65 adjacent the inlet hub 23, arcuate channel wall portions 66, 67, medial parallel channel wall portions 68, 69, arcuate opposing channel wall portions 70, 71 and downstream narrow substantially parallel channel wall portions 72, 73 adjacent the outlet hub 31. The downstream channel wall portions 72, 73 include offset circular wall portions 74, 75, respectively, which define journal means for a downstream or outlet sluice 160 to be described more fully hereinafter. The channel walls 62, 63 thereby define in the downstream direction of flow, as is best illustrated in FIG. 12, a narrow first upstream flow channel portion 76, a circular flow channel portion 77, a first medial narrow flow channel portion 78, a second medial circular flow channel portion 79 and a narrow downstream flow channel portion 80.

As is best illustrated in FIG. 4 of the drawings, the bottom wall 12 which defines the entirety of the first fluid flow path FFP1 and the first fluid flow channel 61 are stepped and includes an upstream bottom wall portion 12' tapered slightly downwardly in the direction of flow from the inlet hub 23, a medial lower wall portion 12''' which is horizontal, and a downstream wall portion 12'''' which is tapered to and through the outlet hub 31. The bottom walls 53 of the tablet feed tubes 50 rest upon the downwardly stepped but horizontal bottom wall portion 12'' (FIG. 4) which also places all lower tablets Tl and specifically the bottommost tablets Tb directly accessible to low flow wastewater to accomplish desired chemical dosage. The taper of the bottom wall portions 12' and 12''' provides drainage at essentially no-flow conditions. This lowermost low flow or channel 61 assures not only proper dosage at low flow conditions by increasing the velocity of low flows but prevents the bottom tablets Tb from swelling and flaking off.

Due to the horizontal wall portion 12'' of the bottom wall 12, the heights of the tablet feed tubes 50 are standardized to an identical height which could not be the case if, for example, the bottom wall 12 were entirely tapered downwardly from the inlet hub 23 to the outlet hub 31. Furthermore, since the ribs 55 of the tablet feed tubes 50 elevate the lowermost tablets Tb (FIG. 4), the latter will dry under no-flow conditions even if a minor amount of wastewater remains on the horizontal wall portion 12' prior to completely evaporating therefrom.

Second means 90 define an intermediate fluid flow channel and a second or intermediate fluid flow path FFP2 (FIG. 13) along and above the bottom wall 12 which is additive to the first fluid flow path FFP1 for further increasing the exposure of the lowermost tablets Tl to increased velocity fluid flow through the chamber 30. The second means 90 includes two generally horizontally disposed flow walls or decks 91, 92 which extend between upper edges (unnumbered) of the channel walls 62, 63 and terminate at bottom edges (unnumbered) of arcuate vertical convexly opposing channel walls 93, 94. The horizontally disposed flow walls 91, 92 also merge with portions of the peripheral wall 13 outboard of or outside of the arcuate channel walls 93, 94 which impart the general configuration to the second or intermediate fluid flow path FFP2 shown in FIG. 13. Thus, at intermediate fluid flow through the fluid chamber 30 in excess of the low flow which is generally confined along the low flow or first fluid flow path FFP1, increased flow or intermediate flow results in a rise of the wastewater to the intermediate or second fluid flow path FFP2 confined within the second flow channel 90. Thus, at such intermediate flows of wastewater through the fluid chamber 30, the wastewater flow is the additive or total flow of the flow reflected by the fluid flow paths FFP1 and FFP2 of FIG. 13 which automatically results in increased dosing as the wastewater level rises and additional tablets T are exposed thereto through the slots 54 of the tablet feed tubes 50.

Third means 100 define a maximum fluid flow channel and a third fluid flow path FFP3 (FIG. 13) along and furthermost above the lower wall 12 which is additive to the first/low flow fluid path FFP1 and to the second/intermediate fluid flow path FFP2 to maximize dosage. The third means 100 includes a horizontally disposed flow wall or deck 101 above the arcuate channel wall 93 and a horizontally disposed flow wall or deck 102 above the arcuate channel wall 94. The horizontally disposed flow walls 101, 102 merge at the medial portions 20, 21 of the peripheral wall 13 and impart the general configuration to the high flow or third fluid flow path FFP3 illustrated in FIG. 13. Thus, at highest wastewater flow through the chamber 30, the fluid flow designated by the volume of the flow paths FFP1, FFP2 and FFP3 are additive to maximize tablet exposure and thus maximize and precisely control chemical dosage. In this fashion, the lowermost or first fluid flow channel 61 and the fluid flow path FFP1 of the overall multi-tiered flow deck 60 establishes low flow dosage conditions and also forms a drainage and dry down channel during no-flow conditions. As the flow increases (up to 3 gallons per minute), the wastewater rises into the intermediate flow channel 90 establishing the intermediate fluid flow path FFP2, the shape of which causes the flow to accelerate as it passes the feed tubes 50. At flow rates above three (3) gallons per minute, the wastewater rises to the third or uppermost tier or channel 100 which dissipates the flow of velocity due to the increased area defined by the peripheral wall 13, thus producing a consistent chemical dosage from the tablets T as tablet exposure increases via the slots 54 upon waste-water height increase.

Upstream baffle means or weir means is provided in the form of a generally vertical baffle plate or weir plate, generally designated by the reference numeral 110 (FIG. 4) which includes a generally circular opening 111. Opposite side edges of the weir plate 110 are received in slots 112 formed by extremely narrow U-shaped ribs 113 formed in each of the upstream side wall portions 16, 17. The ribs 113 in the side wall portions 16, 17 project inwardly toward each other and tightly gripped vertical edges of the weir plate 110 such that a lowermost or bottom edge 115 thereof can be fictionally held at any pre-selected desired vertical distance above the bottom wall portion 12' of the bottom wall 12 (FIG. 4) to accommodate the tablet feeder 10 for sporadic high fluid flow conditions.

The downstream side wall portions 18, 19 are each also provided with inwardly directed vertically extended ribs 116, 117 which define therebetween vertical slots 118 into which can be inserted interchangeable downstream weir plates (not shown). Such interchangeable outlet weir plates are of a generally inverted U-shaped configuration and have vertical slots of 1", 2" and 3" sizes to vary the liquid level and thus increase or decrease the chemical dosage, as an alternative to the preferable utilization of the outlet sluice 160 which will be described more fully hereinafter.

The tablet feed tubes 50 are securely maintained in their operative dosing positions by means of a horizontal stationary plate 120 and a cover 130.

The horizontal stationary plate 120 (FIGS. 4 and 5) is contoured to the general configuration of the peripheral wall 13 and includes a downstream horizontal wall portion 121, a medial horizontal wall portion 122 and an upstream transverse edge 123 which allows access to the upstream weir plate 110, as is best illustrated in FIG. 5. The medial horizontal wall portion 122 includes two circular openings 124 (FIG. 4) bounded by tapered walls 125 which facilitate the downward insertion of the tablet feed tubes 50 into the fluid chamber 30. Two journal means or openings 126 (FIGS. 4 and 11) are formed in the downstream horizontal wall portion 121 for journalling therein respective sluice members of a downstream sluice 160 which will be described more fully hereinafter. The stationary horizontal insert 120 includes a depending peripheral flange 127 (FIGS. 4, 8, 9 and 10) which borders the entirety thereof except for the edge 123. The bottom edge (unnumbered) of the flange 127 rests upon horizontally aligned inwardly directed supporting beads, ribs or shelves 128 formed in each of the medial wall portions 20, 21 of the peripheral wall 13 and a similar inwardly directed bead or projection 129 formed in the downstream end wall portion 15. Means 138 (FIGS. 1–3) are formed in the exterior of the peripheral wall 13 just above the ribs 128, 129 to define locating points which can be drilled during assembly of the tablet feeder 10 to form holes (unnumbered) thereat and to also form holes (also unnumbered) in the peripheral flange 127 (FIG. 9) into which can be inserted and fastened conventional rivets 139 for relatively rigidly securing the stationary horizontal insert 120 to the peripheral wall 13 and thereby assuring that the tablet feed tubes 50 are securely held in the positions best illustrated in FIG. 4 of the drawings.

The cover 130 includes an end wall 131 having bosses 132 which receive therein the tablet feed tube caps 59 (FIG. 4). The cover 130 preferably includes a depending flange 133 contoured to the configuration of the peripheral wall 13 of the housing 11 and having diametrically opposite inwardly directed opposing latches bosses 134, and at upstream and downstream edges of the peripheral flange 133 are radially inwardly directed latching ribs 135. The latching bosses 134 engage in outwardly opening recesses 136 of the peripheral wall 13 while the latching ribs 135 engage with an uppermost one of outwardly opening latching grooves 137 formed in the upstream and downstream end wall portions 14, 15, respectively, of the housing 11. There are three such latching ribs 137 formed in each of the end wall portions 14, 15 at equal distances/heights from each other, for a purpose to be described more fully hereinafter. However, with the cover 130 positioned as illustrated in FIG. 4, the bosses 132 of the cover 130 thereof further augment the alignment and support offered each of the tablet feed tubes 50 in the manner most clearly evident from FIG. 4.

The outwardly opening latching bosses 136 also define diametrically opposite inwardly directed strut connecting bosses 140 (FIGS. 4 and 12) across which can be spanned and connected a reinforcing strut 145. One or more such reinforcing struts 145 can be placed in spanning relationship across the medial wall portions 20, 21 (FIGS. 2 and 5), and each includes a central cylindrical rod 146 to opposite ends of which are threadedly connected identical sleeves 147 having axially outwardly opening recesses 148 into which each of the bosses 140 is telescopically inserted. A fastener (not shown) can be used to secure each boss 140 to a wall (not shown) of each recess 148 to thereby secure each reinforcing strut 145 in spanning relationship internally of and to the medial wall portions 21, 22 of the peripheral wall 13 to reinforce the overall tablet housing 11.

Figure 14:
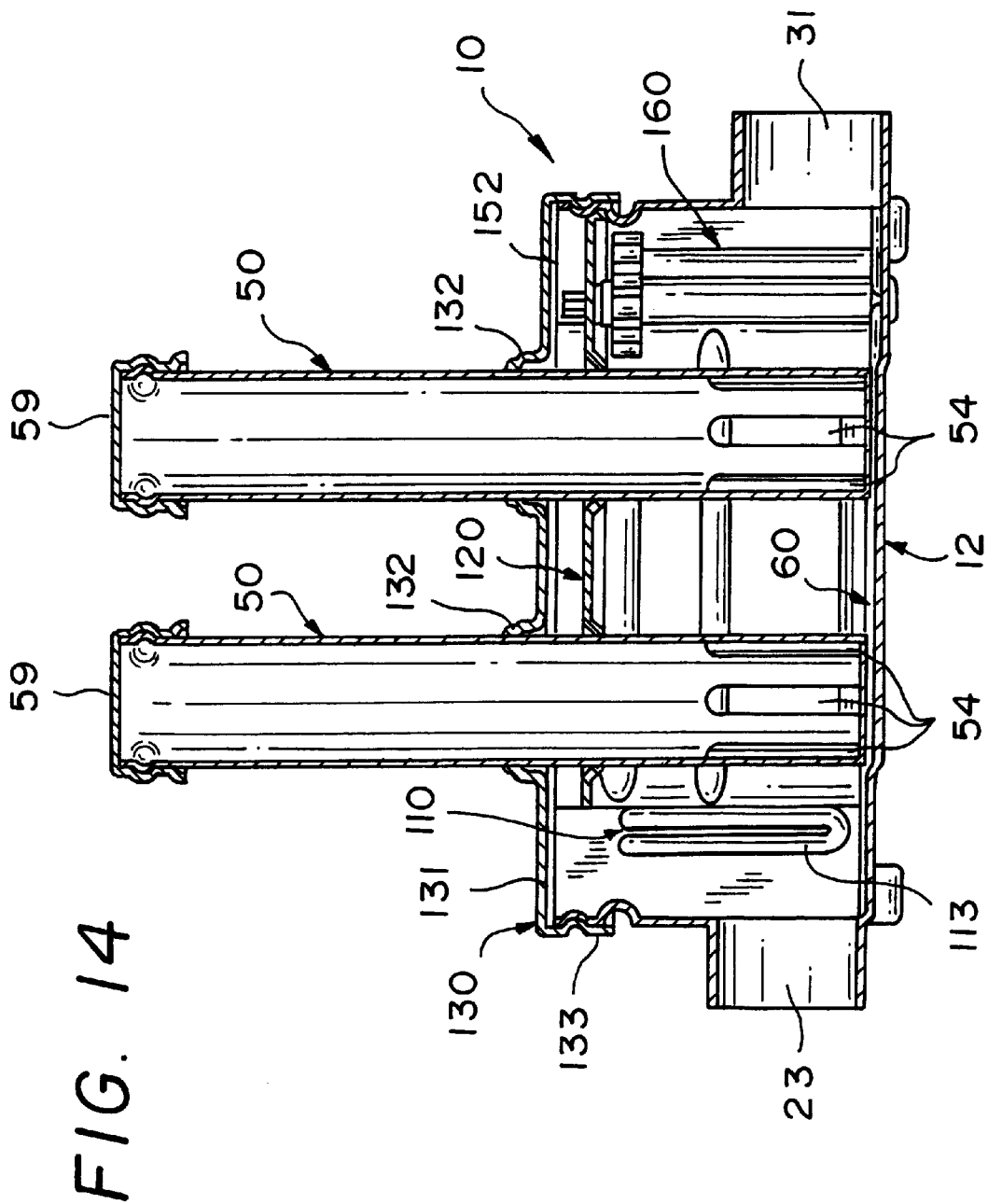
FIG. 14 is a vertical cross-sectional view taken through the tablet feeder of the invention, but illustrates upper riser portions removed, holes cut in the cover, and the cover accommodating therethrough the tablet feed tubes thereby effecting rapid conversion of an internal tablet feeder to an external tablet feeder.
Figure 17:
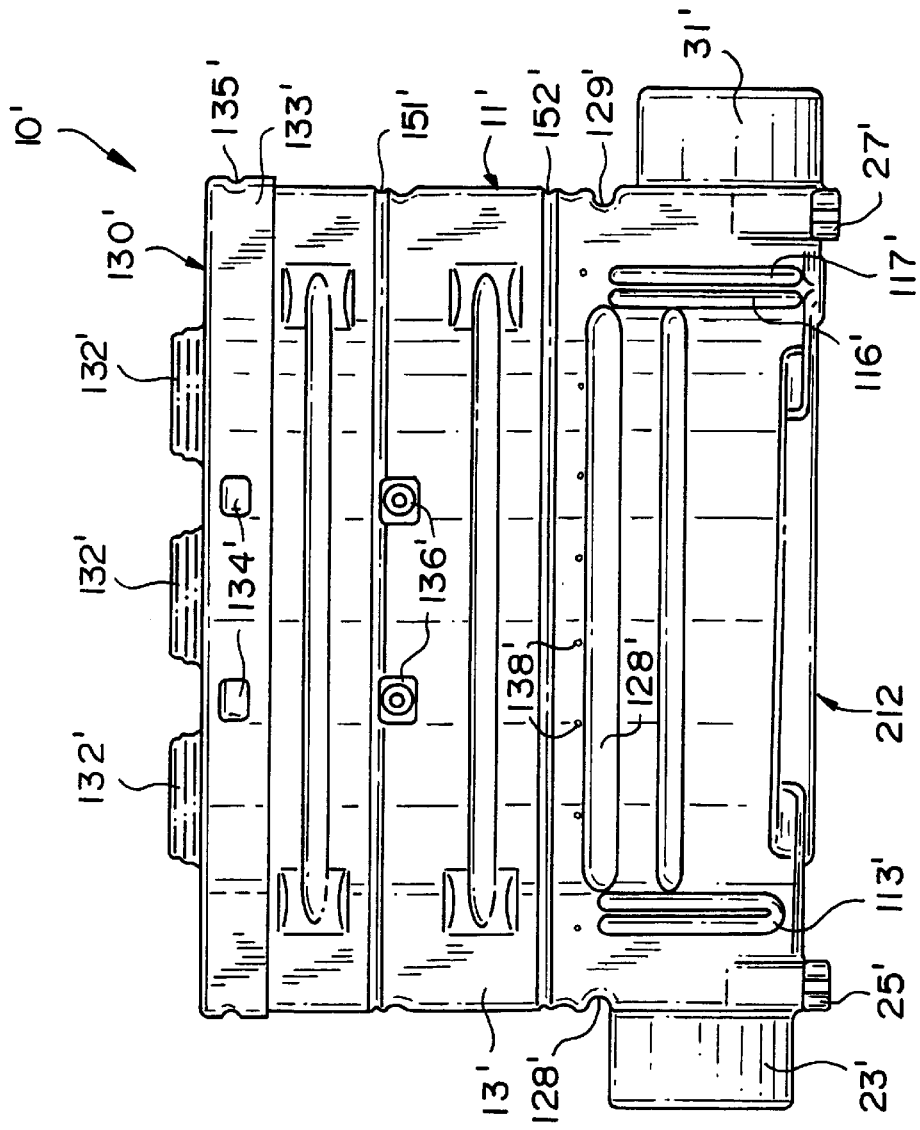
FIG. 17 is a side elevational view of another tablet feeder, and illustrates components thereof identical to those heretofore described but designed as a four tablet feed tube unit for high flow/commercial application.
Figure 18:
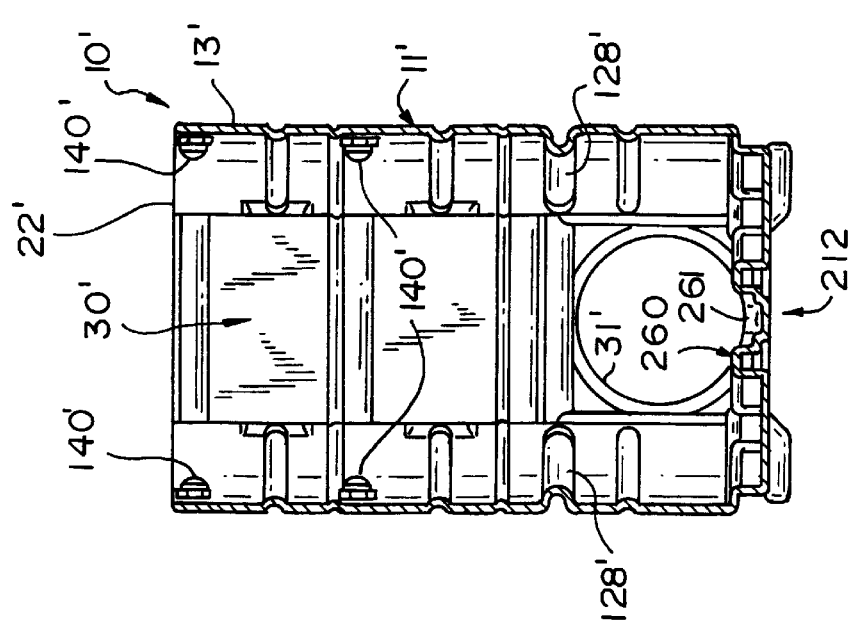
FIG. 18 is a vertical cross-sectional view taken through the tablet feeder of FIG. 17, and illustrates a bottom wall thereof defining a multi-tiered flow deck.
Figure 19:
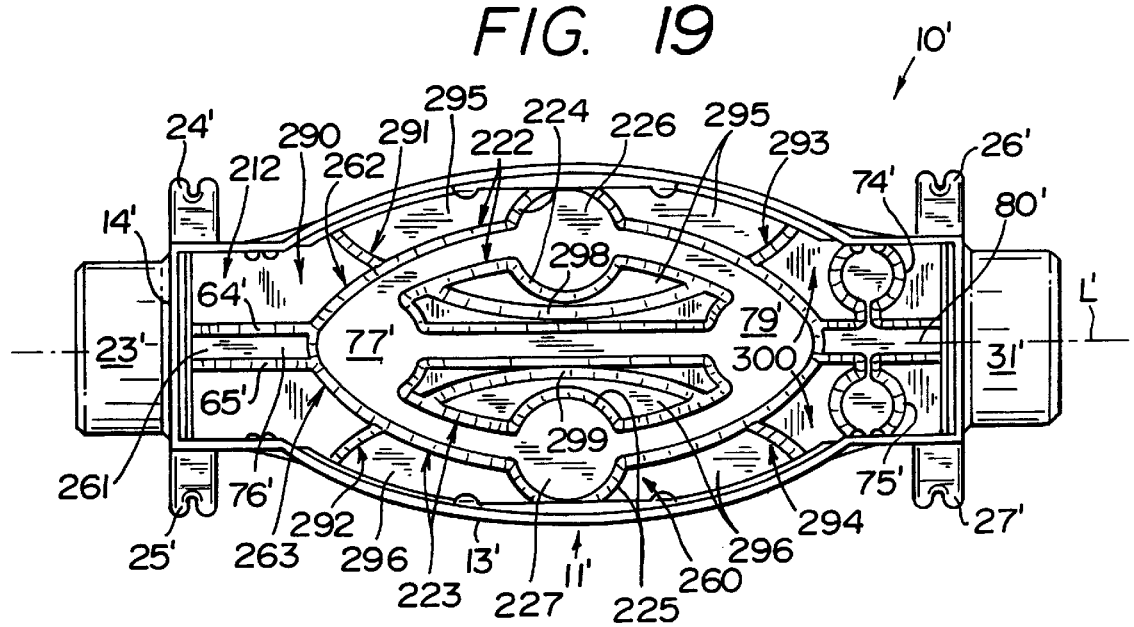
FIG. 19 is a horizontal cross-sectional view taken through the tablet feeder of FIG. 17 just above a multi-tiered flow deck thereof, and illustrates the configuration thereof defining a lowermost tier or channel, an intermediate tier or channel and an uppermost tier or channel.

The peripheral wall 13 also includes two peripherally extending narrow, outwardly opening cut channels 151, 152 located approximately 6" from each other which define a guide groove along which the peripheral wall 13 can be in-field severed or cut. The channel 151 is located 6" below the uppermost peripheral edge 22, whereas the cut channel 152 is located approximately 12" below the peripheral edge 22. Depending upon in-field conditions, an upper 6" section 153 of the entire tablet housing 11, defined between cut channel 151 and the uppermost peripheral edge 22, can be removed by severing the housing 11 along the cut channel 151. Alternatively, the upper section 153 and another lower 6" section 154 can be collectively removed by severing the housing 11 along the cut channel 152. The latter relationship is illustrated in FIG. 14 in conjunction with the removal of end panels (unnumbered) from the bosses 132 of the cover 130. Thus, depending upon grade, in-line, or in the contact tank of a water or wastewater treatment system installation, the overall tablet feeder 10 can be relatively quickly modified in the field for relatively low flow applications (FIG. 14) with, of course, the tablet tubes 50 being readily accessible for tablet replacements/replenishment purposes.

It should also be particularly noted with respect to FIG. 14 that when either or both of the housing portions 153, 154 are removed, the latching grooves 137 of the upstream and downstream end walls 14, 15, respectively, will receive the latching ribs 135 of the cover 130. Thus, whether the sections 153, 154 are retained (FIG. 3) or removed (FIG. 14), the same cover 130 can be utilized.

Figure 6:
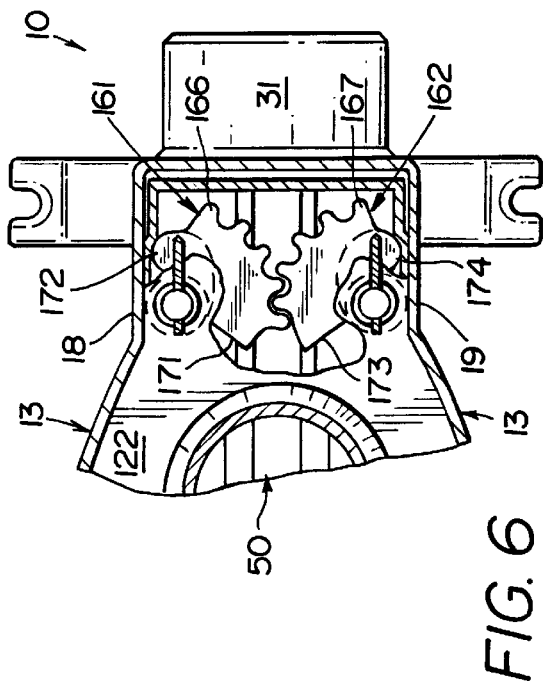
FIG. 6 is a fragmentary horizontal cross-sectional view with a portion thereof broken away for clarity of the right-hand side of FIG. 5, and illustrates gear segments of a pair of sluice members meshed with each other in one of many relative adjusted positions therebetween.
Figure 8:
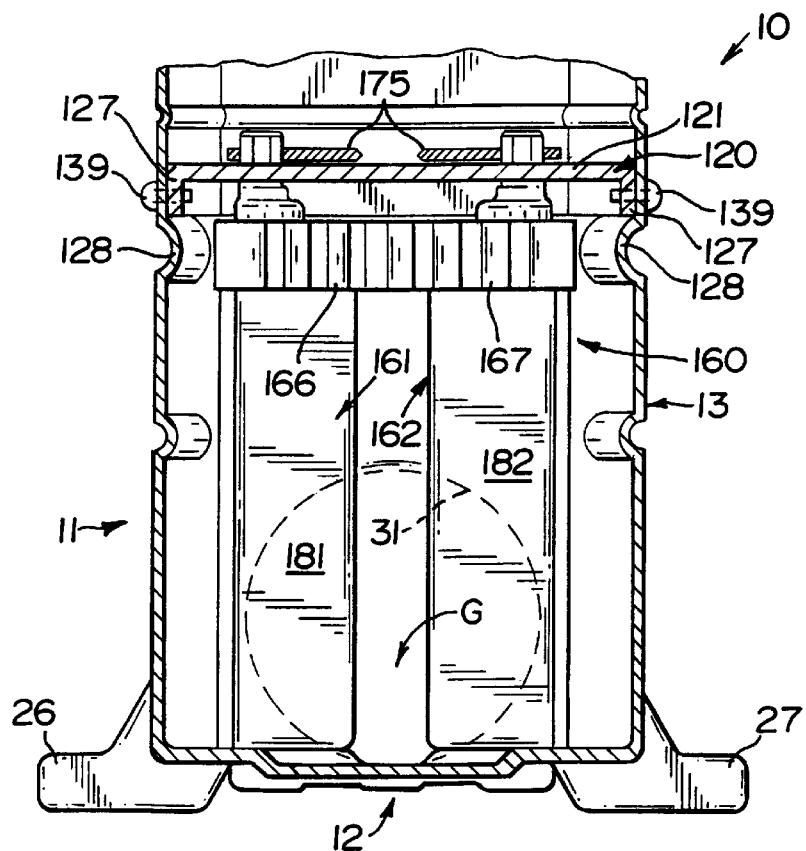
FIG. 8 is a fragmentary vertical cross-sectional view taken generally along line 8—8 of FIG. 7, and illustrates a flow gap defined between the sluice members.
Figure 9:
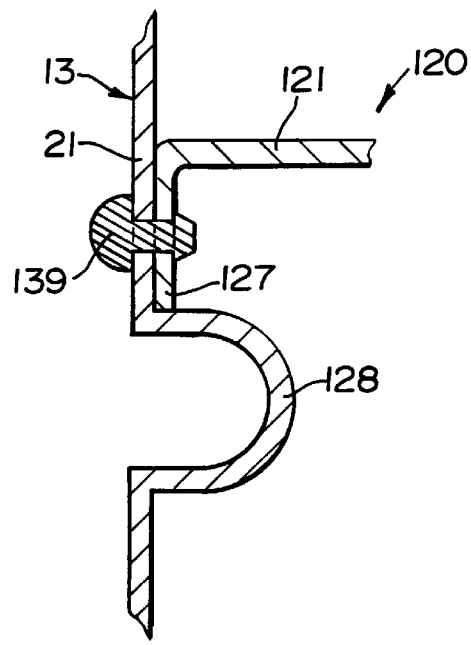
FIG. 9 is a highly enlarged cross-sectional view taken generally along line 9—9 of FIG. 1, and illustrates one of several rivets connecting the feeder housing to a downwardly directed peripheral flange of the horizontal stationary insert.

Sluice means in the form of an adjustable downstream sluice 160 (FIGS. 4 through 8 and 11) is provided immediately adjacent the outlet hub 31 to adjustably control the height of wastewater within the chamber 30 and thereby regulate the height of liquid flow thereof through the outlet hub 31. The sluice means 160 includes a pair of sluice members or sluice segments 161, 162 each formed as a single piece of molded polymeric/copolymeric plastic material, such as polyethylene. Each sluice segment 161, 162 includes first journalling means 163, 163 in the form of a cylindrical end portion which projects through the openings 126 formed in the horizontal stationary insert 120 (FIG. 11). The sluice segments 161, 162 also include second journal means in the form of downwardly projecting pin portions 164, 165 which seat in the circular offset portions or journals 74, 75 of the downstream channel walls 72, 73 (FIG. 12). Upper end portions (unnumbered) of the sluice segments 161, 162 include means for drivingly interconnecting the sluice segments or sluice gates in the form of gear segments 166, 167. The gear segments 166, 167 have respective opposite stop means 171, 172 and 173, 174 (FIGS. 5 and 6) which abut the peripheral wall 13 to establish a narrow sluice opening (FIG. 7) and a wide sluice opening (FIG. 6). The abutment means or stop surfaces 171, 173 are relatively flat (FIG. 6) and when the sluice segments 161, 162 are rotated just beyond the position shown in FIG. 7, the flat abutment surfaces 171, 173 contact the peripheral wall 13, whereas opposite rotation brings the rounded stop means or abutments 172, 174 into abutment with the downstream side wall portions 18, 19, respectively (FIG. 6). The relative positions of the sluice segments 161 are indicated by pins 175 projecting through diametric holes of the upper end portions 163, 163 and overlying printed indicia 176 on the upper surface of the downstream horizontal wall portion 121 (FIG. 5) of the horizontal stationary insert 120. The indicia 176 preferably includes markings in the form of 1",2" and 3" which at the outer ranges reflect minimum and maximum opening of the sluice segments 161, 162. An opening G (FIGS. 8 and 11) is defined by the sluice segments 161, 162 by relatively convexly opposing surfaces 181, 182 thereof. The respective sluice segments 161, 162, which collectively define therebetween the relatively narrow vertical flow opening or gap G (FIG. 8), can be rotated by simply rotating one or the other of the projecting ends 163, 163 which preferably are hexagonally profiled to receive an appropriate tool.

Under maximum flow conditions with the sluice segments 161, 162 of the adjustable sluice 160 fully opened (FIG. 6), sufficient turbulence is created beyond the flow opening G and before the discharge end wall 15 to create wastewater/chemical agent admixture. However, under low flow conditions and/or a minimum size of the flow opening G, such turbulence is created by the opposing convex surfaces 181, 182 which essentially direct the wastewater flow convergingly outwardly past the gap G and toward the end wall 15, as is indicated by the unnumbered headed arrows in FIG. 6, thereby increasing turbulence in the wastewater to achieve maximized admixture thereof with the chemical agent prior to discharge through the outlet hub 31.

Reference is made to FIG. 15 of the drawings which illustrates a riser 190 seated atop and secured to the uppermost peripheral edge portion 22 of the peripheral wall 13 of the tablet housing 11 of the tablet feeder 10 for extended or below grade installation. The riser 190 is approximately 24 inches in height and is defined by four riser sections 191–194 with continuous outwardly concavely opening peripheral cut channels 195 being located between the riser sections 191, 192; 192, 193; and 193; 194. The uppermost cut channel 195 is spaced approximately six inches from an upper peripheral edge 197 (FIG. 21) of the upper riser section 191. The next lower cut channel 195 between the riser sections 192, 193 is located 12 inches below the uppermost peripheral edge 197 of the upper riser section 191. The last cut line 195 between the riser sections 193, 194 is located approximately 18 inches below the uppermost peripheral edge 197 of the riser 190. If it is desired to install the tablet feeder 10 a considerable distance below grade or having access to the cover 130 at an extended distance above the flow line, the entire riser 190 can be utilized in the manner illustrated in FIGS. 15 and 21, namely, a peripheral lower edge 196 of the riser 190 is snap-secured in mating configuration to the uppermost peripheral edge 22 of the peripheral wall 13 of the tablet housing 11 of the tablet feeder 10 after, of course, the cover 130 has been first removed therefrom. If the entire vertical length of the riser 190 is utilized, the cover 130 is snap-secured to the upper peripheral edge 197 of the upper riser section 191 in the manner illustrated in FIGS. 15 and 21. The lower peripheral flange 196 can be additionally securely fixed to the peripheral wall 13 of the housing 11 by the use of the plastic rivets, such as the rivets 139, applied in-field after holes have been drilled at the locating points 138'.

Reinforcing struts (not shown), identical to the reinforcing struts 145, can be secured in any one or all of the riser sections 191 through 194 in association with opposing bosses which have been identified by the reference numeral 140' because they are identical in construction to the bosses 140, as is all other structure similarly primed in FIGS. 15 and 21. If, however, the below grade or extended installation is associated with installations having topographical elevations which cannot be readily accommodated by only the height of the housing 11, yet is less than would be accommodated by the addition of the entire riser 190, any one or more of the riser sections 191 through 194 can be removed by simply cutting along an appropriate cut channel 195 to remove from the riser 190 any one or more of the riser sections 191 through 194. In this manner the overall volume of the tablet feeder 10 can be essentially decreased in substantially even-volume increments by appropriately removing substantially equal six inch riser section 191, 192 and/or 193 thereby accommodating the tablet feeder 10 for most any topographical elevations associated with a particular installation. One or more additional risers, corresponding to the riser 190, can be added to the riser 190 to accommodate extreme below grade or extreme extended installations.

Reference is made to FIGS. 17 through 20 of the drawings which disclose another novel tablet feeder constructed in accordance with this invention which is designed for intermediate to high flow volume flows and is generally designated by the reference numeral 10'. All reference characters which have been primed hereinafter in the drawings, whether specifically referenced in the specification, identify structure identical to that heretofore described relative to the low to intermediate flow tablet feeder 10.

As in the case of the low to intermediate flow tablet feeder 10, the intermediate to high flow tablet feeder 10' is also constructed from high density, UV rated, rotational molded polyethylene and includes a tablet housing or body 11'.

The tablet housing 11' includes a bottom wall 212 (FIGS. 17 through 19) and a peripheral wall 13' of a generally elliptical shape somewhat longer than the peripheral wall 13 of the tablet housing 11 of the tablet feeder 10.

The bottom wall 212 is stepped, partially tapered and configured to define a multi-tiered flow deck 260.

The multi-tiered flow deck 260 includes first means 261 in the form of a low flow fluid channel for defining a first fluid flow path FFP1' (FIG. 20) along the bottom wall 212 for increasing the exposure of lowermost tablets (not shown) and particularly the bottom tablets (also not shown) to relatively low velocity fluid flow along the bottom wall 212 from an inlet hub 23' through a fluid chamber 30' to and through an outlet hub 31'. The first means 261 is defined by substantially identical vertical channel walls corresponding to those of the first means 61 of the tablet feeder 10, and these walls have all been identically identified and primed in FIG. 19. However, as opposed to the first means 61 of the tablet feeder 10 which includes continuous vertical channel walls 62, 63, similar vertical channel walls 262, 263 are interrupted by pairs of arcuate vertical channel walls 222, 222; 223, 223; respectively, which each medially thereof include generally circular wall portions 224, 225, respectively. The circular wall portions 224, 225 set-off circular flow channel portions 226, 227.

Figure 20:
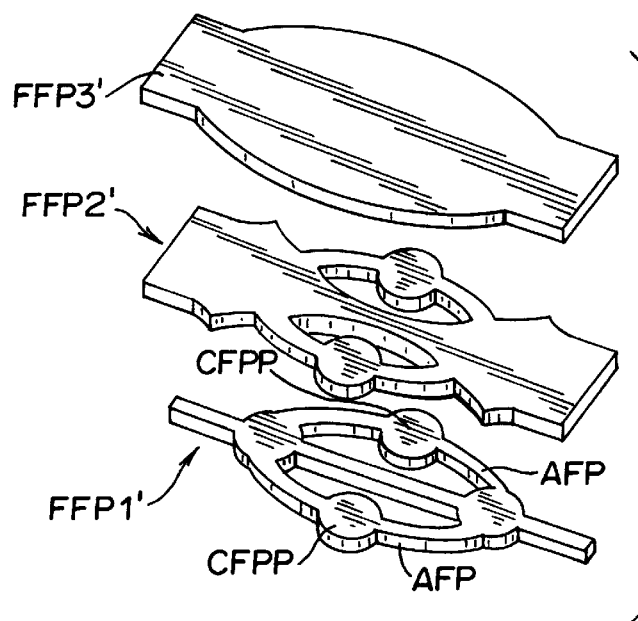
FIG. 20 is an exploded schematic view, and illustrates the tier configuration of the lowermost, intermediate and uppermost flow tiers and the flow patterns thereof under low flow/no flow, intermediate flow and maximum flow conditions through the tablet feeder.

As is best illustrated in FIG. 20 of the drawings, at low flow the first fluid flow path FFP1' is defined by the first means 261 which corresponds essentially identically to the first flow path FFP1 (FIG. 13) of the tablet feeder 10, but additionally includes identical arcuate flow path portions AFP, AFP each including medially thereof a circular flow path portion CFPP. Thus, tablets in tablet feeder tubes (not shown) resting upon the circular flow channel portions 77', 79', 226 and 227 are subject to water/wastewater flowing along the fluid flow path FFP1' of FIG. 20 under relative low flow and/or no flow conditions.

The tablet feeder 10' also includes second means 290 defining an intermediate fluid flow channel and a second or intermediate fluid flow path FFP2' (FIG. 19) along and above the bottom wall 212 which is additive to the first fluid flow path FFP1' for further increasing the exposure of the lowermost tablets (not shown) to increased height of fluid flow through the chamber 30'. The second means 290 includes two generally angularly disposed channel walls 291, 292 adjacent the inlet 23', two similar generally angularly disposed walls 293, 294 adjacent the downstream outlet 31', and two arcuate walls 298, 299 merging at ends thereof with innermost ones of the arcuate walls 222, 223. The walls 291 through 294, 298 and 299 rise upwardly from uppermost edges (unnumbered) of the walls 222, 223 and merge with pairs of horizontal walls or flow decks 295, 296; 295, 296 on opposite sides of a longitudinal center line L' which extend substantially between the arcuate walls 291, 293 and 292, 294 and are confined also between the peripheral wall 13' and each of the walls 222, 224 and 223, 225 thereby defining a second fluid flow path FFP2' of the general configuration illustrated in FIG. 20. Thus, at intermediate fluid flow and increased fluid height through the fluid chamber 30' in excess of the low flow which is generally confined along the low flow or first fluid flow path FFP1' results in a rise of the wastewater to the intermediate or second fluid flow path FFP2' confined within the second means or second flow chamber 290. Thus, at such intermediate flows of wastewater through the fluid chamber 30', the wastewater flow is the additive or total flow of the flow reflected by the fluid flow paths FFP1' and FFP2' which automatically results in increased dosing of the tablets in the four tablet tubes (not shown), as the wastewater level rises and additional tablets therein (also not shown) are exposed to fluid.

Third means 300 define a maximum fluid flow channel and a third fluid flow path FFP3' along and furthermost above the lower or bottom wall 212 which is additive to the first/low flow fluid path FFP1' and to the second/intermediate fluid flow path FFP2' to maximize dosage. The third means 300 is defined essentially by the overall chamber 30' and specifically the interior configuration of the peripheral wall 13' thereof, as is evident in FIG. 20 of the drawings. Thus, at highest wastewater flow through the chamber 30', the fluid flow designated by the volume of the flow paths FFP1', FFP2' and FFP3' are additive to maximize total exposure in each of the four tablet feed tubes (not shown) and thus maximize and precisely control chemical dosage, particularly in intermediate to high flow applications ranging up to flows of 200,000 GPD (gallons per day). Under higher flow conditions, the intermediate to high tablet feeder 10' can, of course, have associated therewith one or more risers corresponding to the riser 190 of FIG. 15 but contour to the precise configuration of the peripheral wall 13' of the tablet feeder 10'.

If either of the tablet feeders 10, 10' and its associated riser 190 is located extended or below grade, access to the tablet feeder tubes 50 and the tablets T therein might present a problem, particularly if several of the risers 190 are utilized in a single installation. As is best illustrated in FIG. 21 of the drawings, the tablet feeder tubes 50 are illustrated associated with caps, closures or closing means 400 which are identical to the covers 59 except an end panel 401 of each cover or cap 400 is conical in configuration and terminates in an axial upwardly directed externally threaded male connecting portion 402. The male connecting portion 402 of each cap 400 matches a female internally threaded portion 403 of means 405 (FIG. 23) in the form of a tool or rod for facilitating the removal and/or reinsertion of each of the tablet feed tubes 50 relative to the fluid chamber 30 or 30'. The tool 405 is simply an elongated solid or hollow rod of plastic or metallic material which includes a male threaded end portion 404 opposite the female threaded end portion 403. The total length of the rod or tool 405 is approximately 12 inches and two such tools 405 can be threadedly connected to each other, as shown in FIG. 21, with the lowermost female threaded end portion 403 being connected to the male threaded end portion 402 of each cap 400. The exposed end portions of each tool 405 are covered by plastic caps 408 (FIG. 21).

During initial installation of the tablet feeder 10 of FIG. 21, the tablet feeder tubes 50 are filled with tablets, the caps 400 are secured thereto, as are the tools 405. The tools 405 remain internally of the tablet feeder 10 during installation and while in use. Therefore, should it become necessary subsequently to replace and/or add tablets, the cover 130 is simply removed, the tools 405 are grasped and lifted upwardly, and the entire tablet feed tubes 50 can be withdrawn from the tablet feeder 10 and any number of associated risers 190. Thereafter, the caps 400 can be removed, new tablets inserted therein, the caps 400 replaced, and the tools utilized to reinsert the now-filled tablet tubes 50 to the position shown in FIG. 21. The cover 130 is replaced to the position shown in FIG. 21.

The tool 405 is also designed to be utilized with a generally hook-shaped member 411 (FIG. 22) having a male threaded end portion 412, a hook-shaped portion 413 and a blunt end 414. The hook-shaped portion 413 can be threaded into the female threaded recess 403 of the tool 405 or any number of such tools can be threadedly connected to each other for other specific purposes. For example, the hook portion 413 can be placed in the opening 111 (FIG. 4) of the baffle plate 110 to insert or withdraw or adjust the baffle plate 110 relative to either of the tablet feeders 10, 10' when associated with one or more risers 190. The blunt nose 414 can be used to push downwardly against an upper edge (unnumbered) of the baffle plate 110, should such be necessary for insertion purposes, though the hook portion 413 is specifically designed for the insertion and withdrawal of the baffle plate 110 via the opening 111 as aforesaid. Obviously, other members can be designed for association with the tool 405 for other purposes associated with the tablet feeders 10, 10', as for example, providing a drive member (not shown) with an internal drive configuration corresponding to the configuration of the journalling means or ends 163 (FIG. 11) of the sluice segments 161, 162 to adjust these utilizing the tool 405, once again when either of the tablet feeders 10, 10' is associated with one or more of the risers 190.

Although a preferred embodiment of the invention has been specifically illustrated and described herein, it is to be understood that minor variations may be made in the apparatus without departing from the spirit and scope of the invention, as defined the appended claims.

What is claimed is:

1. A tablet feeder for fluid comprising a housing including a lower wall and a peripheral wall defining a fluid chamber through which fluid is adapted to flow between an inlet and an outlet of said housing, at least one tablet feed tube having a lower end portion adjacent said lower wall and an upper end portion remote from said lower wall, said tablet feed tube lower end portion having opening means for exposing tablets within said tablet feed tube lower end portion to fluid flowing through said fluid chamber, first means for defining a first fluid flow path along said lower wall for exposing said tablet feed tube lower end portion to first velocity fluid flow along said lower wall, and second means for defining a second fluid flow path along said lower wall and additive to said first fluid flow path for increasing the exposure of said tablet feed tube lower end portion to an increased second velocity fluid flow along said lower wall.

2. The tablet feeder as defined in claim 1 including third means for defining a third fluid flow path along said lower wall and additive to said first and second fluid flow paths for substantially maximizing the exposure of said tablet feed tube lower end portion to substantially maximized fluid flow height along said lower wall.

3. The tablet feeder as defined in claim 2 wherein said first fluid flow path is confined substantially wholly within said second fluid flow path, and said first and second fluid flow paths are confined substantially wholly within said third fluid flow path.

4. The tablet feeder as defined in claim 3 wherein said first fluid flow path includes upwardly opening upstream and downstream relatively narrow channel portions and a substantially larger channel portion therebetween.

5. The tablet feeder as defined in claim 2 wherein said first fluid flow path is an upwardly opening channel.

6. The tablet feeder as defined in claim 2 wherein said first fluid flow path is an upwardly opening channel, and said upwardly opening channel includes a first channel portion which is substantially narrower with respect to at least a second channel portion of said upwardly opening channel whereby fluid flow velocity is increased at said first velocity fluid flow to thereby effect efficient tablet erosion.

7. The tablet feeder as defined in claim 1 wherein said first fluid flow path is an upwardly opening channel.

8. The tablet feeder as defined in claim 1 wherein said first fluid flow path is an upwardly opening channel, and said upwardly opening channel includes a first channel portion which is substantially narrower with respect to at least a second channel portion of said upwardly opening channel whereby fluid flow velocity is increased at said first velocity fluid flow to thereby effect efficient tablet erosion.

9. The tablet feeder as defined in claim 1 wherein said first fluid flow path is an upwardly opening channel, said upwardly opening channel includes a first channel portion which is substantially narrower with respect to at least a second channel portion of said upwardly opening channel whereby fluid flow velocity is increased at said first velocity fluid flow to thereby effect efficient tablet erosion, and said upwardly opening channel merges in a downstream flow direction with a substantially circular area upon which rests said tablet feed tube lower end portion.

10. The tablet feeder as defined in claim 1 wherein said first means include a pair of spaced upwardly projecting channel-defining walls.

11. The tablet feeder as defined in claim 1 wherein said first means include a pair of spaced upwardly projecting channel-defining walls having adjacent channel-defining wall portions in substantially parallel relationship to each other.

12. The tablet feeder as defined in claim 1 wherein said first means include a pair of spaced upwardly projecting upstream channel-defining wall portions merging with downstream concavely opposing channel-defining wall portions collectively setting-off an area within which is seated said tablet feed tube lower end portion.

13. The tablet feeder as defined in claim 1 wherein said first fluid flow path includes upwardly opening upstream and downstream relatively narrow channel portions and a substantially larger channel portion therebetween.

14. The tablet feeder as defined in claim 1 wherein said first fluid flow path includes upwardly opening upstream and downstream relatively narrow channel portions and a substantially larger channel portion therebetween, and said tablet feed tube lower end portion seats upon said larger channel portion.

15. The tablet feeder as defined in claim 1 wherein said first fluid flow path includes upwardly opening upstream and downstream relatively narrow channel portions and a substantially larger channel portion therebetween, said tablet feed tube lower end portion seats upon said larger channel portion, and said narrow and larger channel portions are defined by a pair of relatively spaced upwardly projecting channel-defining walls.

16. The tablet feeder as defined in claim 1 wherein said first means includes a pair of spaced upwardly projecting upstream channel-defining wall portions between which is defined said first fluid flow path in the form of an upwardly opening channel, said pair of upstream channel-defining wall portions each merging with an upper fluid flow surface, said second means including a second pair of spaced upwardly projecting medial channel-defining wall portions between which are confined said first-mentioned pair of upstream channel-defining wall portions, and an upper fluid flow surface bridges said upstream and medial channel-defining wall portions whereby fluid overflowing said upstream channel-defining wall portions flows upon said fluid flow surface defining said second fluid flow path and is confined therein by said medial channel-defining wall portions.

17. The tablet feeder as defined in claim 16 wherein said first fluid flow path is an upwardly opening channel, said upwardly opening channel includes a first channel portion which is substantially narrower with respect to at least a second channel portion of said upwardly opening channel whereby fluid flow velocity is increased at said first velocity fluid flow to thereby effect efficient tablet erosion, and said upwardly opening channel merges in a downstream flow direction with a substantially circular area upon which rests said tablet feed tube lower end portion.

18. The tablet feeder as defined in claim 16 wherein said first fluid flow path includes upwardly opening upstream and downstream relatively narrow channel portions and a substantially larger channel portion therebetween.

19. The tablet feeder as defined in claim 1 wherein said first fluid flow path is confined substantially wholly within said second fluid flow path.

20. A tablet feeder for fluid comprising a housing including a lower wall and a peripheral wall defining a fluid chamber through which fluid is adapted to flow between an inlet and an outlet of said housing, a plurality of tablets, means for feeding the plurality of tablets such that at least a lowermost tablet adjacent said lower wall is exposed to fluid flowing through said fluid chamber, first means for defining a first fluid flow path along said lower wall for exposing said lowermost tablet to first velocity fluid flow along said lower wall, and second means for defining a second fluid flow path along said lower wall and additive to said first fluid flow path for further increasing the exposure of said lowermost tablet to an increased second velocity fluid flow along said lower wall.

21. The tablet feeder as defined in claim 20 including third means for defining a third fluid flow path along said lower wall and additive to said first and second fluid flow paths for substantially maximizing the exposure of said lowermost tablet to substantially maximized velocity fluid flow along said lower wall.

22. The tablet feeder as defined in claim 20 wherein said first fluid flow path is an upwardly opening channel.

23. The tablet feeder as defined in claim 22 wherein said upwardly opening channel is defined by a pair of spaced upwardly projecting channel-defining walls.

24. The tablet feeder as defined in claim 22 wherein said upwardly opening channel is defined by a pair of spaced upwardly projecting channel-defining walls having closely spaced upstream channel-defining wall portions whereby fluid flow velocity is increased at said first velocity fluid flow to thereby effect efficient tablet erosion.

25. The tablet feeder as defined in claim 22 wherein said upwardly opening channel is defined by a pair of spaced upwardly projecting channel-defining walls having closely spaced downstream channel-defining wall portions whereby fluid flow velocity is increased at said first velocity fluid flow to thereby effect efficient tablet erosion.

26. The tablet feeder as defined in claim 22 wherein s aid upwardly opening channel is defined by a pair of spaced upwardly projecting channel-defining walls having spaced upstream and downstream channel-defining wall portions whereby fluid flow velocity is increased at said first velocity fluid flow to thereby effect efficient tablet erosion.

27. The tablet feeder as defined in claim 22 wherein said upwardly opening channel is defined by a pair of spaced upwardly projecting channel-defining walls having spaced upstream and downstream channel-defining wall portions whereby fluid flow velocity is increased at said first velocity if flow to thereby effect efficient tablet erosion, and a pair of generally circular areas between said upstream and downstream channel-defining wall portions upon which seat said at least one and another lowermost tablets.

28. The tablet feeder as defined in claim 20 wherein said first fluid flow path is an upwardly opening channel, and said lowermost tablet is seated in said upwardly opening channel.

29. The tablet feeder as defined in claim 20 wherein said first fluid flow path is an upwardly opening channel, and said lowermost tablet is seated in a substantially circular area of said upwardly opening channel.

30. A tablet feeder for fluid comprising a housing including a lower wall and a peripheral wall defining a fluid chamber through which fluid is adapted to flow between an inlet and an outlet of said housing, at least one tablet feed tube having a lower end portion adjacent said lower wall and an upper end portion remote from said lower wall, said tablet feed tube lower end portion having opening means for exposing tablets within said tablet feed tube lower end portion to fluid flowing through said fluid chamber, first means for defining a first fluid flow path extending substantially from said inlet to said outlet, said first fluid flow path being a first channel defined by opposite spaced first channel-defining walls, said tablet feed tube lower end portion being exposed to fluid flow through said first channel, second means defining a second fluid flow path additive to said first fluid flow path, said second fluid flow path being a second channel defined by opposite spaced second channel-defining walls positioned at opposite sides of said first channel, and a fluid-flow surface bridging said first and second channel-defining walls whereby low fluid flow is confined in said first channel and increased fluid flow creates overflow upon said fluid-flow surface and into said second channel.

31. The tablet feeder as defined in claim 30 including third means defining a third fluid flow path additive to said first and second fluid flow paths, said third fluid flow path being a third channel defined by portions of said peripheral wall positioned at opposite sides of said first and second channels, and a second fluid-flow surface bridging said second channel-defining walls and said peripheral wall portions whereby maximum fluid flow is confined at least in part by said peripheral wall and said portions thereof.

32. The tablet feeder as defined in claim 30 wherein said first channel includes a base channel wall extending substantially between said inlet and outlet, and at least a portion of said base channel wall is tapered downwardly in the direction of fluid flow through said first channel.

33. The tablet feeder as defined in claim 30 wherein said first channel includes a base channel wall extending substantially between said inlet and said outlet, upstream and downstream wall portions of said base channel wall are each tapered downwardly in the direction of fluid flow through said first channel, and a medial wall portion of said base channel between said upstream and downstream wall portions is substantially horizontal.

34. A tablet feeder for fluid comprising a housing including a peripheral wall defining a fluid chamber through which fluid is adapted to flow between an inlet and an outlet of said housing, at least one tablet feed tube housing a plurality of tablets and having a lower end portion and an upper end portion, said tablet feed tube lower end portion having opening means for exposing tablets within said tablet feed tube lower end portion to fluid flowing through said fluid chamber, means for defining a fluid flow path between said inlet and said outlet; said fluid flow path having an upstream flow path portion, a downstream flow path portion and a medial flow path portion between said upstream and downstream flow path portions, at least one of said upstream and downstream flow path portions being tapered downwardly in the direction of fluid flow, said medial flow path portion being substantially horizontal, said tablet feed tube lower end portion being located at said medial flow path portion, and means for spacing a lowermost tablet above said medial flow path portion to thereby prevent undesired tablet-erosion.

35. The tablet feeder as defined in claim 34 wherein said spacing means is located within said tablet feed tube lower end portion.

36. The tablet feeder as defined in claim 34 wherein said tablet feed tube lower end portion includes a peripheral wall and a bottom wall, and said spacing means is an internally raised portion of said bottom wall.

37. The tablet feeder as defined in claim 34 wherein said tablet feed tube lower end portion includes a peripheral wall and a bottom wall, and said spacing means is an internally raised rib of said bottom wall.

38. The tablet feeder as defined in claim 34 wherein said tablet feed tube lower end portion includes a peripheral wall and a bottom wall, and said spacing means is an internally raised downwardly opening rib of said bottom wall.

39. The tablet feeder as defined in claim 34 wherein said tablet feed tube lower end portion includes a peripheral wall and a bottom wall, and said spacing means are a pair of internally raised downwardly opening projections of said bottom wall.

40. A tablet feeder for fluid comprising a housing including a lower wall and a peripheral wall defining a fluid chamber through which fluid is adapted to flow between an inlet and an outlet of said housing, at least two tablet feed tubes housing a plurality of tablets and each having a lower end portion and an upper end portion, said tablet feed tube lower end portions having opening means for exposing tablets within said tablet feed tube lower end portions to fluid flowing through said fluid chamber, means for defining a fluid flow path between said inlet and said outlet; said fluid flow path having an upstream flow path portion, a downstream flow path portion and a medial flow path portion between said upstream and downstream flow path portions, at least one of said flow path portions being tapered downwardly in the direction of fluid flow, at least another of said flow path portions being substantially horizontal, said tablet feed tube lower end portion being located at said at least another flow path portion, and the length of said two tablet feed tubes being substantially identical.

41. A tablet feeder for fluid comprising a housing including a lower wall and a peripheral wall defining a fluid chamber though which fluid is adapted to flow between an inlet and an outlet of said housing, at least one tablet feed tube having a lower end portion adjacent said lower wall and an upper end portion remote from said lower wall, said tablet feed tube lower end portion having means for exposing tablets within said tablet feed tube lower end portion to fluid flowing through said fluid chamber, at least one reinforcing strut spanning said fluid chamber substantially transverse to the direction of fluid flow, means for securing said reinforcing strut to substantially diametrically opposite wall pons of said peripheral wall, and means for locating axially opposite end portions of said reinforcing strut relative to said peripheral wall opposite wall portions.

42. A tablet feeder for fluid comprising a housing including a lower wall and a peripheral wall defining a fluid chamber though which fluid is adapted to flow between an inlet and an outlet of said housing, at least one tablet feed tube having a lower end portion adjacent said lower wall and an upper end portion remote from said lower wall, said tablet feed tube lower end portion having opening means for exposing tablets within said tablet feed tube lower end portion to fluid flowing through said fluid chamber, at least one reinforcing strut spanning said fluid chamber substantially transverse to the direction of fluid flow, means for securing said reinforcing strut to substantially diametrically opposite wall portions of said peripheral wall, a second tablet feed tube having a lower end portion adjacent said lower wall and an upper end portion remote from said lower wall, said second tablet feed tube lower end portion having a plurality of peripherally spaced openings therein through which tablets within said second tablet feed tube lower end portion are adapted to be exposed to fluid flowing through said fluid chamber, and said reinforcing strut is located between said at least one and said second tablet feed tubes.

43. The tablet feeder as defined in claim 42 including means for locating axially opposite end portions of said reinforcing strut relative to said peripheral wall opposite wall portions.

44. A tablet feeder for fluid comprising a housing including a lower wall and a peripheral wall defining a fluid chamber through which fluid is adapted to flow between an inlet and an outlet of said housing, at least one tablet feed tube having a lower end portion adjacent said lower wall and an upper end portion remote from said lower wall, said tablet feed tube lower end portion having opening means for exposing tablets within said tablet feed tube lower end portion to fluid flowing through said fluid chamber, a substantially horizontally disposed wall within said housing spaced above said lower wall, an opening in said horizontally disposed wall, said tablet feed tube projects through said opening and is retained thereby, and means defined by said peripheral wall for identifying fastener location points aligned with a peripheral edge portion of said horizontally disposed wall to effect accurate fastener location therebetween.

45. The tablet feeder as defined in claim 44 wherein said peripheral edge portion is a peripheral flange.

46. A tablet feeder for fluid comprising a housing including a lower wall and a peripheral wall defining a fluid chamber through which fluid is adapted to flow between an inlet and an oulet of said housing, at least one tablet feed tube having a lower end portion adjacent said lower wall and an upper end portion remote from said lower wall, said tablet feed tube lower end portion having opening means for exposing tablets within said tablet feed tube lower end portion to fluid flowing through said fluid chamber, a substantially horizontally disposed wall within said housing spaced above said lower wall, an opening in said horizontally disposed wall, said tablet feed tube projects through said opening and is retained thereby, and means for defining an internally directed ledge upon which a peripheral edge portion of said horizontally disposed wall is supported.

47. The tablet feeder as defined in claim 46 wherein said peripheral edge portion is a peripheral flange.

48. A tablet feeder for fluid comprising a housing including a lower wall and a peripheral wall defining a fluid chamber through which fluid is adapted to flow between an inlet and an outlet of said housing, at least one tablet feed tube having a lower end portion adjacent said lower wall and an upper end portion remote from said lower wall, said tablet feed tube lower end portion having opening means for exposing tablets within said tablet feed tube lower end portion to fluid flowing through said fluid chamber, a substantially horizontally disposed wall within said housing spaced above said lower wall, sluice means for controlling the flow of fluid through said fluid chamber, said sluice means being located adjacent said outlet substantially beneath said horizontally disposed wall, first means for journalling said sluice means for rotation in said horizontally disposed wall, and second means for journalling said sluice means for rotation in said lower wall whereby said sluice means can be selectively ad unstably rotated between minimum and maximum flow conditions.

49. The tablet feeder as defined in claim 48 wherein said sluice means are a pair of sluice gates.

50. The tablet feeder as defined in claim 48 wherein said sluice means are a pair of sluice gates, and means drivingly interconnecting said sluice gates whereby rotation of either sluice gate imparts rotation to the other sluice gate.

51. The tablet feeder as defined in claim 50 wherein at least one of said sluice gates includes a stem projecting through an opening defined by said first journalling means whereby said sluice gates can be simultaneously rotatably adjusted from above said horizontally disposed wall.

52. The tablet feeder as defined in claim 51 including means for limiting the rotation of said sluice gates at said minimum and maximum flow conditions.

53. The tablet feeder as defined in claim 48 wherein said sluice means are a pair of sluice gates, and intermeshed gear means drivingly interconnecting said sluice gates whereby rotation of either sluice gate imparts rotation to the other sluice gate.

54. The tablet feeder as defined in claim 48 wherein said first journalling means is an opening in said horizontally disposed wall through which projects a journal of said sluice means.

55. The tablet feeder as defined in claim 48 including means for limiting the rotation of said sluice means at said minimum and maximum flow conditions.

56. The tablet feeder as defined in claim 48 wherein an upper surface of said horizontally disposed wall carries indicia means corresponding to positions of rotation of said sluice means.

57. The tablet feeder as defined in claim 48 wherein said sluice means includes a stem projecting through an opening defined by said first journalling means whereby said sluice means can be rotatably adjusted from above said horizontally disposed wall.

58. A tablet feeder for fluid comprising a housing including a lower wall and a peripheral wall defining a fluid chamber through which fluid is adapted to flow between an inlet and an outlet of said housing, at least one tablet feed tube having a lower end portion adjacent said lower wall and an upper end portion remote from said lower wall, said tablet feed tube lower end portion having opening means for exposing tablets within said tablet feed tube lower end portion to fluid flowing through said fluid chamber, said peripheral wall including an uppermost peripheral edge portion, a riser defined by a peripheral wall and including upper and lower peripheral edge portions, said fluid chamber peripheral wall and said riser peripheral wall being of substantially matching contours, cooperative wall means between said fluid chamber upper peripheral edge portion and said riser peripheral wall lower edge portion for substantially matingly matchingly securing the same to each other, said riser peripheral wall being defined by a plurality of superposed riser sections each of a predetermined height with adjacent riser sections being united at a peripherally severable wall portion, and each peripherally severable wall portion substantially matching both a peripheral wall of a cover and the riser lower peripheral edge portion whereby riser heights can be selectively varied in riser section multiples in association with a common cover and housing.

59. The tablet feeder as defined in claim 58 wherein said riser sections are of substantially identical heights.

60. The tablet feeder as defined in claim 58 wherein said cover peripheral wall is secured to said riser upper peripheral edge portion, and said cover includes a boss within which is seated said tablet feed tube upper end portion.

61. The tablet feeder as defined in claim 58 wherein said cover peripheral wall is secured to said riser upper peripheral edge portion, and said feed tube upper end portion includes means for securing a relatively long tool thereto for manually withdrawing and reinserting said tablet feed tube relative to said housing under relatively deep buried conditions of use to facilitate tablet replenishment.

62. The tablet feeder as defined in claim 58 wherein said cover peripheral wall is secured to said riser upper peripheral edge portion, and said feed tube upper end portion includes thread means for securing a relatively long tool thereto for manually withdrawing and reinserting said tablet feed tube relative to said housing under relatively deep buried conditions of use to facilitate tablet replenishment.

63. A tablet feeder for fluid comprising a housing including a lower wall and a peripheral wall defining a fluid chamber through which fluid is adapted to flow between an inlet and an outlet of said housing, a cover closing said chamber, at least one tablet feed tube having a lower end portion adjacent said lower wall and an upper end portion remote from said lower wall, said tablet feed tube lower end portion having opening means for exposing tablets within said tablet feed tube lower end portion to fluid flowing through said fluid chamber, first means for defining a first fluid flow path along said lower wall for exposing said tablet feed tube lower end portion to relatively low velocity fluid flow along said lower wall, second means for defining a second fluid flow path along said lower wall and additive to said first fluid flow path for increasing the exposure of said tablet feed tube lower end portion to increased velocity fluid flow along said lower wall, and said cover includes an opening through which projects said at least one tablet feed tube.

64. A tablet feeder for fluid comprising a housing including a lower wall and a peripheral wall defining a fluid chamber through which fluid is adapted to flow between an inlet and an outlet of said housing, at least one tablet feed tube having a lower end portion adjacent said lower wall and an upper end portion remote from said lower wall, said tablet feed tube lower end portion having opening means for exposing tablets within said tablet feed tube lower end portion to fluid flowing through said fluid chamber, said peripheral wall including an uppermost peripheral edge portion, a riser defined by a peripheral wall and including upper and lower peripheral edge portions, said housing peripheral wall uppermost peripheral edge portion being secured to said riser peripheral wall lower peripheral edge portion, a cover closing said riser at said riser peripheral wall upper peripheral-edge portion, said tablet feed tube upper end portion being spaced substantially below said cover, and means connected to said tablet feed tube upper end portion and projecting toward said cover for facilitating the removal and/or reinsertion of said tablet feed tube relative to said fluid chamber.

65. The tablet feeder as defined in claim 64 wherein said tablet feed tube includes a cover, and said last-mentioned means is connected to said last-mentioned cover.

66. The tablet feeder as defined in claim 64 wherein said last-mentioned means is a relatively long tool.

67. The tablet feeder as defined in claim 64 wherein said last-mentioned means is a relatively long sectional tool.

68. The tablet feeder as defined in claim 67 including means for removably coupling and uncoupling an end of one of said multisectional rods relative to said tablet feed tube cover.

69. The tablet feeder as defined in claim 64 wherein said tablet feed tube includes a tablet feed tube cover at said tablet feed tube upper end portion, said last-mentioned means is a rod, and means for securing said rod to said tablet feed tube cover.

70. The tablet feeder as defined in claim 64 wherein said tablet feed tube includes a tablet feed tube cover at said tablet feed tube upper end portion, said last-mentioned means is a multisectional rod, and means for securing said multisectional rod to said tablet feed tube cover.

71. The tablet feeder as defined in claim 70 including cooperative thread means for securing sections of said multisectional rod to each other.

72. The tablet feeder as defined in claim 70 including thread means for securing an end of said multisectional rod to a threaded portion of said tablet feed tube cover.

73. A tablet feeder for fluid comprising a housing including a lower wall and a peripheral wall defining a fluid chamber through which fluid is adapted to flow between an inlet and an outlet of said housing, at least one tablet feed tube having a lower end portion adjacent said lower wall and an upper end portion remote from said lower wall, said tablet feed tube lower end portion having opening means for exposing tablets within said tablet feed tube lower end portion to fluid flowing through said fluid chamber, and means adjacent said outlet for creating downstream fluid eddy currents and turbulent flow prior to fluid discharge through said outlet thereby effecting thorough fluid mixing.

74. The tablet feeder as defined in claim 73 including means for adjusting said eddy current creating means to achieve maximum mixing at minimum fluid flow and vice versa.

75. The tablet feeder as defined in claim 73 wherein said eddy current creating means includes a pair of convexly opposing flow surfaces diverging away from each other in a direction toward said outlet.

76. The tablet feeder as defined in claim 75 wherein said eddy current creating means are a pair of sluice members each including one of said flow surfaces.

77. The tablet feeder as defined in claim 75 wherein said eddy current creating means are a pair of sluice members each including one of said flow surfaces, and said adjusting means include means for rotating said sluice members relative to each other.

78. The tablet feeder as defined in claim 77 including gear means for meshingly engaging said sluice members to effect substantially simultaneous rotation thereof.

79. The tablet feeder as defined in claim 73 wherein said eddy current creating means includes a pair of relatively movable convexly opposing flow surfaces diverging away from each other in a direction toward said outlet.

* * * * *